(12) United States Patent  
Norman et al.

(10) Patent No.: US 8,396,798 B2  
(45) Date of Patent: *Mar. 12, 2013

(54) METHOD AND SYSTEM FOR FACILITATING NETWORK TRANSACTION PROCESSING

(75) Inventors: Richard Norman, Dallas, TX (US); Tommy J. Vicknair, Humble, TX (US); Carl Shishmanian, Louisville, KY (US); John Spence Stephens, Jr., Houston, TX (US); W. Earl Jennings, Dublin, OH (US); David L. James, Mt. Gilead, OH (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/354,402

(22) Filed: Jan. 20, 2012

(65) Prior Publication Data

US 2012/0136782 A1 May 31, 2012

Related U.S. Application Data

(63) Continuation of application No. 11/137,407, filed on May 26, 2005, now Pat. No. 8,121,944, which is a continuation-in-part of application No. 10/874,227, filed on Jun. 24, 2004, now abandoned.

(51) Int. Cl.  
*G06Q 40/00* (2012.01)

(52) U.S. Cl. .......................................... 705/40

(58) Field of Classification Search ...................... 705/40  
See application file for complete search history.

(56) References Cited

U.S. PATENT DOCUMENTS

| 2,005,003 A | 6/1935 | Patton et al. |
| 3,653,480 A | 4/1972 | Yamamoto et al. |
| 3,938,090 A | 2/1976 | Borison et al. |
| 4,050,375 A | 9/1977 | Orleans |
| 4,141,078 A | 2/1979 | Bridges et al. |
| 4,205,780 A | 6/1980 | Burns |
| 4,264,808 A | 4/1981 | Owens et al. |
| 4,321,672 A | 3/1982 | Braun et al. |

(Continued)

FOREIGN PATENT DOCUMENTS

| EP | 0099999 | 7/1983 |
| EP | 421808 | 4/1991 |

(Continued)

OTHER PUBLICATIONS

Allen halen; Innovation in retail payments: bank of England. Quaterly Bulletin 43.4 (Winter 2003): 423-438.*

(Continued)

*Primary Examiner* — Hani M Kazimi  
*Assistant Examiner* — Hatem M Ali  
(74) *Attorney, Agent, or Firm* — Hunton & Williams LLP

(57) ABSTRACT

According to one embodiment, the present invention relates to a method and a system for facilitating settlement processing within a network of financial institutions may include receiving one or more payment items from a plurality of payment entities, at a centralized agent; aggregating the payment items into one or more categories; identifying a payee financial institution and a payor financial institution for each payment items, wherein the payee financial institution and the payor financial institution are different; determining whether the payee financial institution and the payor financial institution are within the network of financial institutions; for the payee and payor within the network, determining at the centralized agent a settlement path within the network of financial institutions for each payment item; and for the payee and payor that are not within the network, forwarding the payment items to a third party settlement entity.

24 Claims, 5 Drawing Sheets

U.S. PATENT DOCUMENTS

| | | | |
|---|---|---|---|
| 4,385,285 A | 5/1983 | Horst et al. |
| 4,396,985 A | 8/1983 | Ohara |
| 4,443,027 A | 4/1984 | McNeely et al. |
| 4,453,074 A | 6/1984 | Weinstein |
| 4,454,414 A | 6/1984 | Benton |
| RE31,692 E | 10/1984 | Tyburski et al. |
| 4,495,018 A | 1/1985 | Vohrer |
| 4,575,621 A | 3/1986 | Dreifus |
| 4,605,844 A | 8/1986 | Haggan |
| 4,614,861 A | 9/1986 | Pavlov et al. |
| 4,617,457 A | 10/1986 | Myers |
| 4,650,981 A | 3/1987 | Foletta |
| 4,672,377 A | 6/1987 | Murphy |
| 4,694,397 A | 9/1987 | Grant et al. |
| 4,697,072 A | 9/1987 | Kawana |
| 4,700,055 A | 10/1987 | Kashkashian, Jr. |
| 4,701,601 A | 10/1987 | Francini et al. |
| 4,713,761 A | 12/1987 | Sharpe et al. |
| 4,752,676 A | 6/1988 | Leonard et al. |
| 4,752,877 A | 6/1988 | Roberts et al. |
| 4,797,913 A | 1/1989 | Kaplan |
| 4,799,156 A | 1/1989 | Shavit |
| 4,807,177 A | 2/1989 | Ward |
| 4,812,628 A | 3/1989 | Boston |
| 4,823,264 A | 4/1989 | Deming |
| 4,845,347 A | 7/1989 | McCrindle |
| 4,859,837 A | 8/1989 | Halpern |
| 4,893,333 A | 1/1990 | Baran et al. |
| 4,931,793 A | 6/1990 | Fuhrmann et al. |
| 4,939,674 A | 7/1990 | Price et al. |
| 4,948,174 A | 8/1990 | Thomson et al. |
| 4,974,878 A | 12/1990 | Josephson |
| 4,975,841 A | 12/1990 | Kehnemuyi et al. |
| 4,977,501 A | 12/1990 | Lefevre |
| 4,988,849 A | 1/1991 | Sasaki |
| 4,992,646 A | 2/1991 | Collin |
| 4,992,940 A | 2/1991 | Dworkin |
| 5,023,904 A | 6/1991 | Kaplan |
| 5,053,607 A | 10/1991 | Carlson |
| 5,054,096 A | 10/1991 | Beizer |
| 5,072,380 A | 12/1991 | Randelman et al. |
| 5,080,748 A | 1/1992 | Bonomi |
| 5,097,115 A | 3/1992 | Ogasawara et al. |
| 5,111,395 A | 5/1992 | Smith |
| 5,121,945 A | 6/1992 | Thomson et al. |
| 5,122,950 A | 6/1992 | Mee |
| 5,136,502 A | 8/1992 | Van Remortel et al. |
| 5,175,682 A | 12/1992 | Higashiyama |
| 5,187,750 A | 2/1993 | Behera |
| 5,198,975 A | 3/1993 | Baker et al. |
| 5,220,501 A | 6/1993 | Lawlor |
| 5,224,034 A | 6/1993 | Katz et al. |
| 5,225,978 A | 7/1993 | Peterson |
| 5,237,159 A | 8/1993 | Stephens |
| 5,237,620 A | 8/1993 | Deaton |
| 5,257,486 A | 11/1993 | Holmwall |
| 5,265,007 A | 11/1993 | Barnhard, Jr. et al. |
| 5,276,311 A | 1/1994 | Hennige |
| 5,283,829 A | 2/1994 | Anderson |
| 5,287,269 A | 2/1994 | Dorrough et al. |
| 5,311,594 A | 5/1994 | Penzias |
| 5,315,508 A | 5/1994 | Bain et al. |
| 5,321,238 A | 6/1994 | Watanabe |
| 5,326,959 A | 7/1994 | Perazza |
| 5,336,870 A | 8/1994 | Hughes |
| 5,349,170 A | 9/1994 | Kern |
| 5,350,906 A | 9/1994 | Brody et al. |
| 5,351,187 A | 9/1994 | Hassett |
| 5,352,877 A | 10/1994 | Morley |
| 5,367,581 A | 11/1994 | VanHorn |
| 5,373,550 A | 12/1994 | Campbell |
| 5,382,784 A | 1/1995 | Eberhardt |
| 5,396,417 A | 3/1995 | Burks |
| 5,402,474 A | 3/1995 | Miller |
| 5,412,190 A | 5/1995 | Kopesec |
| 5,424,938 A | 6/1995 | Wagner |
| 5,430,644 A | 7/1995 | Deaton et al. |
| 5,432,506 A | 7/1995 | Chapman |
| 5,444,794 A | 8/1995 | Uhland |
| 5,444,841 A | 8/1995 | Glasser et al. |
| 5,446,740 A | 8/1995 | Yien |
| 5,448,471 A | 9/1995 | Deaton et al. |
| 5,459,482 A | 10/1995 | Orlen |
| 5,465,206 A | 11/1995 | Hilt et al. |
| 5,477,040 A | 12/1995 | Lalonde |
| 5,479,494 A | 12/1995 | Clitherow |
| 5,483,445 A | 1/1996 | Pickering |
| 5,484,988 A | 1/1996 | Hills |
| 5,495,981 A | 3/1996 | Warther |
| 5,500,890 A | 3/1996 | Rogge et al. |
| 5,502,576 A | 3/1996 | Ramsay et al. |
| 5,504,677 A | 4/1996 | Pollin |
| 5,506,691 A | 4/1996 | Bednar et al. |
| 5,508,731 A | 4/1996 | Kohorn |
| 5,513,250 A | 4/1996 | McAllister |
| 5,532,464 A | 7/1996 | Josephson et al. |
| 5,532,689 A | 7/1996 | Bueno |
| 5,541,583 A | 7/1996 | Mandelbaum |
| 5,544,043 A | 8/1996 | Miki et al. |
| 5,544,046 A | 8/1996 | Niwa |
| 5,550,734 A | 8/1996 | Tater |
| 5,551,021 A | 8/1996 | Harada |
| 5,557,515 A | 9/1996 | Abbruzzese et al. |
| 5,563,400 A | 10/1996 | Le Roux |
| 5,566,330 A | 10/1996 | Sheffield |
| 5,568,489 A | 10/1996 | Yien |
| 5,570,465 A | 10/1996 | Tsakanikas |
| 5,572,004 A | 11/1996 | Raimann |
| 5,583,759 A | 12/1996 | Geer |
| 5,583,760 A | 12/1996 | Klesse |
| 5,590,196 A | 12/1996 | Moreau |
| 5,590,197 A | 12/1996 | Chen |
| 5,592,377 A | 1/1997 | Lipkin |
| 5,592,378 A | 1/1997 | Cameron |
| 5,599,528 A | 2/1997 | Igaki |
| 5,602,936 A | 2/1997 | Green et al. |
| 5,603,025 A | 2/1997 | Tabb |
| 5,615,109 A | 3/1997 | Eder |
| 5,617,474 A | 4/1997 | Ditzig et al. |
| 5,619,558 A | 4/1997 | Jheeta |
| 5,621,201 A | 4/1997 | Langhans |
| 5,621,812 A | 4/1997 | Deaton et al. |
| 5,638,457 A | 6/1997 | Deaton et al. |
| 5,640,577 A | 6/1997 | Scharmer |
| 5,642,419 A | 6/1997 | Rosen |
| 5,642,485 A | 6/1997 | Deaton et al. |
| 5,644,723 A | 7/1997 | Deaton et al. |
| 5,644,778 A | 7/1997 | Burks et al. |
| 5,649,114 A | 7/1997 | Deaton et al. |
| 5,649,117 A | 7/1997 | Landry |
| 5,652,786 A | 7/1997 | Rogers |
| 5,659,165 A | 8/1997 | Jennings |
| 5,659,469 A | 8/1997 | Deaton et al. |
| 5,659,741 A | 8/1997 | Eberhardt |
| 5,666,493 A | 9/1997 | Wojcik et al. |
| 5,677,521 A | 10/1997 | Garrou |
| 5,677,955 A | 10/1997 | Doggett et al. |
| 5,679,938 A | 10/1997 | Templeton |
| 5,679,940 A | 10/1997 | Templeton |
| 5,680,459 A | 10/1997 | Hook et al. |
| 5,687,250 A | 11/1997 | Curley et al. |
| 5,687,322 A | 11/1997 | Deaton et al. |
| 5,692,132 A | 11/1997 | Hogan |
| 5,698,837 A | 12/1997 | Furuta |
| 5,699,528 A | 12/1997 | Hogan |
| 5,703,344 A | 12/1997 | Bezy et al. |
| 5,704,044 A | 12/1997 | Tarter et al. |
| 5,708,422 A | 1/1998 | Blonder et al. |
| 5,710,889 A | 1/1998 | Clark et al. |
| 5,715,298 A | 2/1998 | Rogers |
| 5,715,314 A | 2/1998 | Payne |
| 5,715,399 A | 2/1998 | Bezos |
| 5,717,989 A | 2/1998 | Tozzoli et al. |
| 5,724,424 A | 3/1998 | Gifford |
| 5,727,153 A | 3/1998 | Powell |
| 5,748,780 A | 5/1998 | Stolfo |
| 5,751,842 A | 5/1998 | Eccles |

| Patent | Date | Inventor |
|---|---|---|
| 5,757,917 A | 5/1998 | Rose et al. |
| 5,770,843 A | 6/1998 | Rose et al. |
| 5,774,553 A | 6/1998 | Rosen |
| 5,783,808 A | 7/1998 | Josephson |
| 5,784,696 A | 7/1998 | Melnikof |
| 5,787,403 A | 7/1998 | Randle |
| 5,789,732 A | 8/1998 | McMahon et al. |
| 5,793,861 A | 8/1998 | Haigh |
| 5,794,221 A | 8/1998 | Egendorf |
| 5,796,827 A | 8/1998 | Coppersmith et al. |
| 5,802,498 A | 9/1998 | Comesanas |
| 5,802,499 A | 9/1998 | Sampson et al. |
| 5,819,236 A | 10/1998 | Josephson |
| 5,819,238 A | 10/1998 | Fernholz |
| 5,826,241 A | 10/1998 | Stein |
| 5,826,245 A | 10/1998 | Sandberg-Diment |
| 5,832,090 A | 11/1998 | Raspotnik |
| 5,832,447 A | 11/1998 | Rieker |
| 5,832,457 A | 11/1998 | O'Brien |
| 5,832,460 A | 11/1998 | Bednar |
| 5,832,464 A | 11/1998 | Houvener et al. |
| 5,832,488 A | 11/1998 | Eberhardt |
| 5,835,580 A | 11/1998 | Fraser |
| 5,835,603 A | 11/1998 | Coutts |
| 5,835,899 A | 11/1998 | Rose et al. |
| 5,852,811 A | 12/1998 | Atkins |
| 5,852,812 A | 12/1998 | Reeder |
| 5,859,419 A | 1/1999 | Wynn |
| 5,864,609 A | 1/1999 | Cross et al. |
| 5,870,456 A | 2/1999 | Rogers |
| 5,870,721 A | 2/1999 | Norris |
| 5,870,723 A | 2/1999 | Pare |
| 5,870,725 A | 2/1999 | Belinger et al. |
| 5,873,072 A | 2/1999 | Kight |
| 5,878,141 A | 3/1999 | Daly et al. |
| 5,883,377 A | 3/1999 | Chapin, Jr. |
| 5,883,810 A | 3/1999 | Franklin et al. |
| 5,884,288 A | 3/1999 | Chang |
| 5,884,290 A | 3/1999 | Smorodinsky et al. |
| 5,897,625 A | 4/1999 | Gustin |
| 5,898,157 A | 4/1999 | Mangili et al. |
| 5,903,881 A | 5/1999 | Schrader |
| 5,907,142 A | 5/1999 | Kelsey |
| 5,910,896 A | 6/1999 | Hahn-Carlson |
| 5,910,988 A | 6/1999 | Ballard |
| 5,915,246 A | 6/1999 | Patterson et al. |
| 5,917,965 A | 6/1999 | Cahill et al. |
| 5,920,847 A | 7/1999 | Kolling et al. |
| 5,930,778 A | 7/1999 | Geer |
| 5,940,811 A | 8/1999 | Norris |
| 5,940,844 A | 8/1999 | Cahill et al. |
| 5,943,656 A | 8/1999 | Crooks |
| 5,945,653 A | 8/1999 | Walker et al. |
| 5,949,044 A | 9/1999 | Walker et al. |
| 5,950,174 A | 9/1999 | Brendzel |
| 5,956,700 A | 9/1999 | Landry |
| 5,960,411 A | 9/1999 | Hartman et al. |
| 5,963,659 A | 10/1999 | Cahill et al. |
| 5,963,925 A | 10/1999 | Kolling et al. |
| 5,966,698 A | 10/1999 | Pollin |
| 5,970,475 A | 10/1999 | Barnes et al. |
| 5,978,780 A | 11/1999 | Watson |
| 5,987,434 A | 11/1999 | Libman |
| 5,987,435 A | 11/1999 | Weiss et al. |
| 5,987,436 A | 11/1999 | Halbrook |
| 5,987,439 A | 11/1999 | Gustin et al. |
| 5,991,749 A | 11/1999 | Morrill, Jr. |
| 5,991,750 A | 11/1999 | Watson |
| 6,000,832 A | 12/1999 | Franklin et al. |
| 6,002,767 A | 12/1999 | Kramer |
| 6,003,762 A | 12/1999 | Hayashida |
| 6,006,205 A | 12/1999 | Loeb et al. |
| 6,006,208 A | 12/1999 | Forst et al. |
| 6,009,442 A | 12/1999 | Chen et al. |
| 6,014,636 A | 1/2000 | Reeder |
| 6,016,482 A | 1/2000 | Molinari et al. |
| 6,016,484 A | 1/2000 | Williams et al. |
| 6,018,718 A | 1/2000 | Walker et al. |
| 6,026,388 A | 2/2000 | Liddy et al. |
| 6,029,139 A | 2/2000 | Cunningham et al. |
| 6,029,153 A | 2/2000 | Bauchner et al. |
| 6,032,133 A | 2/2000 | Hilt et al. |
| 6,032,134 A | 2/2000 | Weissman |
| 6,032,136 A | 2/2000 | Brake, Jr. et al. |
| 6,032,137 A | 2/2000 | Hallard |
| 6,035,281 A | 3/2000 | Crosskey et al. |
| 6,035,285 A | 3/2000 | Schlect et al. |
| 6,035,287 A | 3/2000 | Stallaert et al. |
| 6,036,099 A | 3/2000 | Leighton |
| 6,038,553 A | 3/2000 | Hyde, Jr. |
| 6,041,312 A | 3/2000 | Bickerton et al. |
| 6,041,315 A | 3/2000 | Pollin |
| 6,044,362 A | 3/2000 | Neely |
| 6,045,039 A | 4/2000 | Stinson et al. |
| 6,047,261 A | 4/2000 | Siefert |
| 6,052,674 A | 4/2000 | Zervides et al. |
| 6,058,380 A | 5/2000 | Anderson et al. |
| 6,058,381 A | 5/2000 | Nelson |
| 6,061,665 A | 5/2000 | Bahreman |
| 6,064,764 A | 5/2000 | Bhaskaran et al. |
| 6,064,987 A | 5/2000 | Walker et al. |
| 6,065,675 A | 5/2000 | Teicher |
| 6,067,524 A | 5/2000 | Byerly et al. |
| 6,070,150 A | 5/2000 | Remington et al. |
| 6,070,798 A | 6/2000 | Nethery |
| 6,073,104 A | 6/2000 | Field |
| 6,073,113 A | 6/2000 | Guinan |
| 6,076,072 A | 6/2000 | Libman |
| 6,078,907 A | 6/2000 | Lamm |
| 6,081,790 A | 6/2000 | Rosen |
| 6,085,168 A | 7/2000 | Mori et al. |
| 6,088,683 A | 7/2000 | Jalili |
| 6,088,685 A | 7/2000 | Kiron et al. |
| 6,088,686 A | 7/2000 | Walker et al. |
| 6,092,056 A | 7/2000 | Tull, Jr. et al. |
| 6,092,057 A | 7/2000 | Zimmermann et al. |
| 6,098,053 A | 8/2000 | Slater |
| 6,098,070 A | 8/2000 | Maxwell |
| 6,101,479 A | 8/2000 | Shaw |
| 6,105,007 A | 8/2000 | Norris |
| 6,105,011 A | 8/2000 | Morrison, Jr. |
| 6,108,639 A | 8/2000 | Walker et al. |
| 6,110,044 A | 8/2000 | Stern |
| 6,111,858 A | 8/2000 | Greaves et al. |
| 6,115,690 A | 9/2000 | Wong |
| 6,119,106 A | 9/2000 | Mersky et al. |
| 6,119,107 A | 9/2000 | Polk |
| 6,125,354 A | 9/2000 | MacFarlane et al. |
| 6,128,599 A | 10/2000 | Walker et al. |
| 6,128,602 A | 10/2000 | Northington et al. |
| 6,128,603 A | 10/2000 | Dent et al. |
| 6,129,273 A | 10/2000 | Shah |
| 6,138,118 A | 10/2000 | Koppstein et al. |
| 6,138,917 A | 10/2000 | Chapin, Jr. |
| 6,141,666 A | 10/2000 | Tobin |
| 6,144,946 A | 11/2000 | Iwamura |
| 6,148,293 A | 11/2000 | King |
| 6,149,055 A | 11/2000 | Gatto |
| 6,149,056 A | 11/2000 | Stinson et al. |
| 6,173,272 B1 | 1/2001 | Thomas et al. |
| 6,181,837 B1 | 1/2001 | Cahill et al. |
| 6,185,542 B1 | 2/2001 | Moran et al. |
| 6,185,544 B1 | 2/2001 | Sakamoto et al. |
| 6,188,309 B1 | 2/2001 | Levine |
| 6,202,054 B1 | 3/2001 | Lawlor et al. |
| 6,205,433 B1 | 3/2001 | Boesch et al. |
| 6,213,391 B1 | 4/2001 | Lewis |
| 6,223,168 B1 | 4/2001 | McGurl et al. |
| 6,227,447 B1 | 5/2001 | Campisano |
| 6,233,565 B1 | 5/2001 | Lewis et al. |
| 6,233,566 B1 | 5/2001 | Levine et al. |
| 6,236,972 B1 | 5/2001 | Shkedy |
| 6,240,444 B1 | 5/2001 | Fin et al. |
| 6,243,689 B1 | 6/2001 | Norton |
| 6,267,292 B1 | 7/2001 | Walker et al. |
| 6,278,981 B1 | 8/2001 | Dembo et al. |
| 6,289,322 B1 | 9/2001 | Kitchen et al. |
| 6,292,789 B1 | 9/2001 | Schutzer |

| | | |
|---|---|---|
| 6,301,379 B1 | 10/2001 | Thompson et al. |
| 6,301,567 B1 | 10/2001 | Leong et al. |
| 6,304,858 B1 | 10/2001 | Mosler et al. |
| 6,305,603 B1 | 10/2001 | Grunbok, Jr. et al. |
| 6,308,887 B1 | 10/2001 | Korman et al. |
| 6,321,212 B1 | 11/2001 | Lange |
| 6,324,524 B1 | 11/2001 | Lent et al. |
| 6,327,575 B1 | 12/2001 | Katz |
| 6,338,047 B1 | 1/2002 | Wallman |
| 6,338,049 B1 | 1/2002 | Walker et al. |
| 6,341,724 B2 | 1/2002 | Campisano |
| 6,343,279 B1 | 1/2002 | Bissonette et al. |
| 6,349,290 B1 | 2/2002 | Horowitz et al. |
| 6,363,164 B1 | 3/2002 | Jones et al. |
| 6,363,364 B1 | 3/2002 | Nel |
| 6,363,365 B1 | 3/2002 | Kou |
| 6,366,967 B1 | 4/2002 | Wagner |
| 6,374,235 B1 | 4/2002 | Chen et al. |
| 6,390,362 B1 | 5/2002 | Martin |
| 6,393,409 B2 | 5/2002 | Young et al. |
| 6,405,173 B1 | 6/2002 | Honarvar et al. |
| 6,405,181 B2 | 6/2002 | Lent et al. |
| 6,415,259 B1 | 7/2002 | Wolfinger et al. |
| 6,418,419 B1 | 7/2002 | Nieboer et al. |
| 6,418,420 B1 | 7/2002 | DiGiorgio et al. |
| 6,418,430 B1 | 7/2002 | DeFazio et al. |
| 6,424,949 B1 | 7/2002 | Deaton et al. |
| 6,434,159 B1 | 8/2002 | Woodward et al. |
| 6,446,072 B1 | 9/2002 | Schulze et al. |
| 6,460,020 B1 | 10/2002 | Pool et al. |
| 6,485,922 B1 | 11/2002 | Erickson et al. |
| 6,490,568 B1 | 12/2002 | Omara et al. |
| 6,493,685 B1 | 12/2002 | Ensel et al. |
| 6,513,019 B2 | 1/2003 | Lewis |
| 6,535,896 B2 | 3/2003 | Britton et al. |
| 6,536,663 B1 | 3/2003 | Lozier et al. |
| 6,554,185 B1 | 4/2003 | Montross et al. |
| 6,560,581 B1 | 5/2003 | Fox et al. |
| 6,567,791 B2 | 5/2003 | Lent et al. |
| 6,574,350 B1 | 6/2003 | Rhoads et al. |
| 6,574,377 B1 | 6/2003 | Cahill et al. |
| 6,578,000 B1 | 6/2003 | Dodrill et al. |
| 6,578,015 B1 | 6/2003 | Haseltine et al. |
| 6,607,127 B2 | 8/2003 | Wong |
| 6,609,113 B1 | 8/2003 | O'Leary et al. |
| 6,609,125 B1 | 8/2003 | Layne et al. |
| 6,629,081 B1 | 9/2003 | Cornelius et al. |
| 6,636,615 B1 | 10/2003 | Rhoads et al. |
| 6,658,393 B1 | 12/2003 | Basch et al. |
| 6,661,910 B2 | 12/2003 | Jones et al. |
| 6,704,714 B1 | 3/2004 | O'Leary et al. |
| 6,721,715 B2 | 4/2004 | Nemzow |
| 6,728,397 B2 | 4/2004 | McNeal |
| D490,840 S | 6/2004 | Arakaki et al. |
| D491,186 S | 6/2004 | Arakaki et al. |
| D491,953 S | 6/2004 | Arakaki et al. |
| D496,365 S | 9/2004 | Liu et al. |
| D498,236 S | 11/2004 | Liu et al. |
| 6,820,058 B2 | 11/2004 | Wood et al. |
| 6,824,066 B2 | 11/2004 | Weyant |
| 6,825,940 B1 | 11/2004 | Wu et al. |
| 6,860,375 B2 | 3/2005 | Hallowell et al. |
| 6,865,547 B1 | 3/2005 | Brake, Jr. et al. |
| 6,934,664 B1 * | 8/2005 | Webb et al. .............. 702/188 |
| 6,954,896 B1 | 10/2005 | Dodrill et al. |
| 6,965,882 B1 | 11/2005 | Lapstun et al. |
| 6,970,259 B1 | 11/2005 | Lunt et al. |
| 6,970,830 B1 | 11/2005 | Samra et al. |
| 6,970,855 B2 | 11/2005 | Das et al. |
| RE38,957 E | 1/2006 | Laussermair et al. |
| 6,999,943 B1 | 2/2006 | Johnson et al. |
| 7,004,382 B2 * | 2/2006 | Sandru .............. 235/379 |
| 7,004,384 B2 | 2/2006 | Jones et al. |
| 7,025,256 B1 | 4/2006 | Drummond et al. |
| 7,062,456 B1 | 6/2006 | Riehl et al. |
| 7,068,832 B1 | 6/2006 | Price et al. |
| 7,070,095 B1 | 7/2006 | Gandel et al. |
| 7,104,443 B1 | 9/2006 | Paul et al. |
| 7,133,846 B1 | 11/2006 | Ginter et al. |
| 7,177,836 B1 | 2/2007 | German et al. |
| 7,194,437 B1 | 3/2007 | Britto et al. |
| 7,200,255 B2 | 4/2007 | Jones et al. |
| 7,228,155 B2 | 6/2007 | Saunders |
| 7,249,112 B2 | 7/2007 | Berardi et al. |
| 7,312,707 B1 | 12/2007 | Bishop et al. |
| 7,313,543 B1 | 12/2007 | Crane et al. |
| 7,317,823 B1 | 1/2008 | Price et al. |
| 7,337,148 B2 | 2/2008 | Xie et al. |
| 7,349,884 B1 | 3/2008 | Odom |
| RE40,220 E | 4/2008 | Nichols et al. |
| 7,380,707 B1 | 6/2008 | Fredman |
| 7,401,048 B2 | 7/2008 | Rosedale et al. |
| 7,493,288 B2 | 2/2009 | Biship et al. |
| 7,546,272 B2 | 6/2009 | Loy |
| 7,587,363 B2 | 9/2009 | Cataline et al. |
| 2001/0011222 A1 | 8/2001 | McLauchlin et al. |
| 2001/0018666 A1 | 8/2001 | Sugiyama et al. |
| 2001/0018739 A1 | 8/2001 | Anderson et al. |
| 2001/0027441 A1 | 10/2001 | Wankmueller |
| 2001/0032139 A1 | 10/2001 | Debonnet, Jr. |
| 2001/0034663 A1 | 10/2001 | Teveler et al. |
| 2001/0037300 A1 | 11/2001 | Miyazaki et al. |
| 2001/0037309 A1 | 11/2001 | St. Vrain |
| 2001/0038033 A1 | 11/2001 | Habib |
| 2001/0047334 A1 | 11/2001 | Nappe et al. |
| 2001/0047489 A1 | 11/2001 | Ito et al. |
| 2001/0051533 A1 | 12/2001 | Wietzke et al. |
| 2002/0012445 A1 | 1/2002 | Perry |
| 2002/0013728 A1 | 1/2002 | Wilkman |
| 2002/0023055 A1 | 2/2002 | Antognini et al. |
| 2002/0026394 A1 | 2/2002 | Savage et al. |
| 2002/0032651 A1 | 3/2002 | Embrey |
| 2002/0038363 A1 | 3/2002 | MacLean |
| 2002/0046169 A1 | 4/2002 | Keresman et al. |
| 2002/0047316 A1 | 4/2002 | Chitayat |
| 2002/0052842 A1 | 5/2002 | Schuba et al. |
| 2002/0055907 A1 | 5/2002 | Pater et al. |
| 2002/0069134 A1 | 6/2002 | Solomon |
| 2002/0072976 A1 | 6/2002 | Virtanen et al. |
| 2002/0077978 A1 | 6/2002 | O'Leary et al. |
| 2002/0082985 A1 | 6/2002 | MacKay |
| 2002/0084321 A1 | 7/2002 | Martens et al. |
| 2002/0087415 A1 | 7/2002 | Allen et al. |
| 2002/0087468 A1 | 7/2002 | Ganesan et al. |
| 2002/0087469 A1 | 7/2002 | Ganesan et al. |
| 2002/0091635 A1 | 7/2002 | Dilip et al. |
| 2002/0100803 A1 | 8/2002 | Sehr |
| 2002/0107770 A1 | 8/2002 | Meyer et al. |
| 2002/0107788 A1 | 8/2002 | Cunningham |
| 2002/0111837 A1 | 8/2002 | Aupperle |
| 2002/0128981 A1 | 9/2002 | Kawan et al. |
| 2002/0138390 A1 | 9/2002 | May |
| 2002/0138398 A1 | 9/2002 | Kalin et al. |
| 2002/0156723 A1 | 10/2002 | Lilly et al. |
| 2002/0169658 A1 | 11/2002 | Adler |
| 2002/0170966 A1 | 11/2002 | Hannigan et al. |
| 2002/0178071 A1 | 11/2002 | Walker et al. |
| 2002/0184151 A1 | 12/2002 | Maloney |
| 2002/0194081 A1 | 12/2002 | Perkowski |
| 2002/0194096 A1 | 12/2002 | Falcone et al. |
| 2002/0198817 A1 | 12/2002 | Dhir |
| 2002/0199182 A1 | 12/2002 | Whitehead |
| 2003/0018557 A1 | 1/2003 | Gilbert et al. |
| 2003/0018567 A1 | 1/2003 | Flitcroft et al. |
| 2003/0028481 A1 | 2/2003 | Flitcroft et al. |
| 2003/0037002 A1 | 2/2003 | Higgins et al. |
| 2003/0040959 A1 | 2/2003 | Fei et al. |
| 2003/0046218 A1 | 3/2003 | Albanese et al. |
| 2003/0055675 A1 | 3/2003 | Klein Twennaar |
| 2003/0061132 A1 | 3/2003 | Yu et al. |
| 2003/0069780 A1 | 4/2003 | Hailwood et al. |
| 2003/0097335 A1 | 5/2003 | Muskowitz et al. |
| 2003/0100803 A1 | 5/2003 | Lu et al. |
| 2003/0105641 A1 | 6/2003 | Lewis |
| 2003/0110070 A1 | 6/2003 | De Goeij |
| 2003/0110136 A1 | 6/2003 | Wells et al. |
| 2003/0110442 A1 | 6/2003 | Battle |
| 2003/0120686 A1 | 6/2003 | Kim et al. |

| | | |
|---|---|---|
| 2003/0130945 A1 | 7/2003 | Force et al. |
| 2003/0130952 A1 | 7/2003 | Bell et al. |
| 2003/0144942 A1 | 7/2003 | Sobek |
| 2003/0187787 A1 | 10/2003 | Freund |
| 2003/0187789 A1 | 10/2003 | Karas et al. |
| 2003/0191710 A1 | 10/2003 | Green et al. |
| 2003/0200107 A1 | 10/2003 | Allen et al. |
| 2003/0208421 A1 | 11/2003 | Vicknair et al. |
| 2003/0208441 A1 | 11/2003 | Poplawski et al. |
| 2003/0218066 A1 | 11/2003 | Fernandes et al. |
| 2003/0225663 A1 | 12/2003 | Horan et al. |
| 2003/0233305 A1 | 12/2003 | Solomon |
| 2003/0237046 A1 | 12/2003 | Parker et al. |
| 2004/0010465 A1 | 1/2004 | Michalski et al. |
| 2004/0019605 A1 | 1/2004 | Keown et al. |
| 2004/0029569 A1 | 2/2004 | Khan et al. |
| 2004/0049451 A1 | 3/2004 | Berardi |
| 2004/0049456 A1 | 3/2004 | Dreyer |
| 2004/0064409 A1 | 4/2004 | Kight et al. |
| 2004/0078328 A1 | 4/2004 | Talbert et al. |
| 2004/0094624 A1 | 5/2004 | Fernandes et al. |
| 2004/0133516 A1* | 7/2004 | Buchanan et al. .............. 705/42 |
| 2004/0149544 A1 | 8/2004 | Dal Ferro |
| 2004/0159700 A1 | 8/2004 | Khan et al. |
| 2004/0201735 A1 | 10/2004 | Baron |
| 2004/0210498 A1 | 10/2004 | Freund |
| 2004/0228514 A1 | 11/2004 | Houle et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0252012 A1 | 12/2004 | Beenau et al. |
| 2004/0254837 A1 | 12/2004 | Roshkoff |
| 2004/0260607 A1 | 12/2004 | Robbins et al. |
| 2005/0021466 A1 | 1/2005 | Buchanan et al. |
| 2005/0033619 A1 | 2/2005 | Barnes et al. |
| 2005/0033690 A1 | 2/2005 | Antognini et al. |
| 2005/0035847 A1 | 2/2005 | Bonalle et al. |
| 2005/0040242 A1 | 2/2005 | Beenau et al. |
| 2005/0055254 A1 | 3/2005 | Schmidtberg et al. |
| 2005/0071283 A1 | 3/2005 | Randle et al. |
| 2005/0077349 A1 | 4/2005 | Bonalle et al. |
| 2005/0086178 A1 | 4/2005 | Xie et al. |
| 2005/0091156 A1 | 4/2005 | Hailwood et al. |
| 2005/0097046 A1 | 5/2005 | Singfield |
| 2005/0097050 A1 | 5/2005 | Orcutt |
| 2005/0116024 A1 | 6/2005 | Beenau et al. |
| 2005/0144059 A1 | 6/2005 | Schuessler |
| 2005/0171898 A1 | 8/2005 | Bishop et al. |
| 2005/0177480 A1 | 8/2005 | Huang |
| 2005/0209954 A1 | 9/2005 | Asher et al. |
| 2005/0228751 A1 | 10/2005 | Keown et al. |
| 2005/0261955 A1 | 11/2005 | Humble et al. |
| 2005/0273347 A1 | 12/2005 | Dudley et al. |
| 2006/0020543 A1 | 1/2006 | Sheehan et al. |
| 2006/0036553 A1 | 2/2006 | Gupta et al. |
| 2006/0041540 A1 | 2/2006 | Shannon et al. |
| 2006/0106650 A1 | 5/2006 | Bush |
| 2006/0106717 A1 | 5/2006 | Randle et al. |
| 2006/0136335 A1 | 6/2006 | Ferguson, III |
| 2006/0161501 A1 | 7/2006 | Waserstein et al. |
| 2006/0167989 A1 | 7/2006 | Bashen et al. |
| 2006/0178986 A1 | 8/2006 | Giordano et al. |
| 2006/0206427 A1 | 9/2006 | Love et al. |
| 2006/0259390 A1 | 11/2006 | Rosenberger |
| 2006/0282389 A1 | 12/2006 | Gupte |
| 2006/0287953 A1 | 12/2006 | Chauhan |
| 2007/0005498 A1 | 1/2007 | Cataline et al. |
| 2007/0138255 A1 | 6/2007 | Carreon et al. |
| 2007/0265924 A1 | 11/2007 | Schwarz |
| 2007/0288334 A1 | 12/2007 | Creedle et al. |
| 2008/0010202 A1 | 1/2008 | Schwarz |
| 2008/0040249 A1 | 2/2008 | Re et al. |
| 2008/0116283 A1 | 5/2008 | Newbrough et al. |
| 2008/0193008 A1 | 8/2008 | Mount et al. |
| 2008/0228641 A1 | 9/2008 | Fredman |
| 2009/0043651 A1 | 2/2009 | Schwarz |

FOREIGN PATENT DOCUMENTS

| | | |
|---|---|---|
| EP | 0665486 | 8/1995 |
| EP | 1014318 | 6/2000 |
| JP | 2001-266039 | 9/2001 |
| JP | 2002-24618 | 1/2002 |
| JP | 2002-056063 | 2/2002 |
| JP | 2002-083241 | 3/2002 |
| JP | 2002-087536 | 3/2002 |
| JP | 2002-140505 | 5/2002 |
| WO | WO 91/16691 | 10/1991 |
| WO | WO 93/08545 | 4/1993 |
| WO | WO 94/28497 | 12/1994 |
| WO | WO 96/08783 | 3/1996 |
| WO | WO 9612242 | 4/1996 |
| WO | WO 97/14108 | 4/1997 |
| WO | WO 9745796 | 4/1997 |
| WO | WO 9745814 | 12/1997 |
| WO | WO 98/09260 | 3/1998 |
| WO | WO 9910823 | 3/1999 |
| WO | WO 0039979 | 7/2000 |
| WO | WO 0175730 | 10/2001 |
| WO | WO 02/063432 A3 | 8/2002 |
| WO | WO 2004/079603 | 9/2004 |

OTHER PUBLICATIONS

Kanter, Burton ;The Grantor trust: Handmaiden to the IRS and servant to the taxpayer; 75.12 (Dec. 1997):706-767.*
Bank of America and MerchantWired Align to Deliver More Effcicient Payment; PR Newswire [New York] Apr. 25, 2001:1.*
Anonymous, IEM Product Description Home Screen from Web Page.
Anonymous, Opening the Mail Simultaneous Image Capture, Bank News—New Solutions Oct. 1996.
Anonymous, Business Publications—Wassau Financial Systems' ImageRPS and OPEX Interface a Perfect Match, Work Process Improvement Today, Dec. 1997.
Anonymous, Business Publications—Chapter Reports: Texas Chapter, Work Process Improvement Today, Apr. 1998.
Anonymous, "PNC Bank Adds Chicago to National Lockbox Network" PRNewswire, Nov. 5, 1997.
Arend, Mark; Bank applications fuel optical storage market; ABA Banking Journal; acs01039000, Oct. 1991.
Anonymous, "Alabama Department of Revenue Selects Unisys for imaging solution to speed tax returns, save taxpayers money" Business Wire, Sep. 6, 1995.
Hunt, Robert M., An Introduction to the Economics of Payment Card Networks.
Anonymous, "BancTec Selects Alchemy CD-Based Archival Solution for Remittance Processing System" Business Wire, May 6, 1998.
Keaton, "Bank of America Completes its Rollout of 'Paperless' Processing of Payments" Wall Street Journal (Eastern Edition), (lockbox), Nov. 1, 1999, B.13.
Stanley, et al., "Bank of America Provides Nationwide Image Lockbox Services" Press Release, Bank of America, Oct. 20, 1999.
Anonymous Business Wire; 1A Corp. wins contract with comerica to install the first digital all items archive, one of nation's top 25 bank holding companies expects to streamline operations with the first client/server digital image all items solution; Jan. 9, 1996.
Anonymous Business Wire; IA Corp. shows complex transaction processing software Work vision at AIIM, plus Check Vision and Remit Vision application frameworks for new advanced banking services; IA also recruiting strategic partners and OEMs to distribute new, breakthrough data extraction product to be revealed in the fall, Apr. 14, 1997.
Anonymous, Business Wire; Shawnut bank provides lockbox customers real-time, on-line electronic exception processing, 1A Corp's image-based lockbox system cuts processing time from days to minutes, dramatically increasing customer service; acs010390, Jan. 9, 1996.
CES/NaBANCO introduces stored value card technology blockbuster video is first merchant partner, Business Wire, Inc., Jan. 15, 1996.
Anonymous, "Caere introduces the Model 1800 document remittance processor; compact unit provides cost effective means for low to medium speed document processing" Business Wire, Oct. 19, 1995.

Malyykhina, Elena, Cell Phone Software Formats Checks for Online Banking, Information Week—Business Innovation Powered by Technology, Jan. 24, 2008.

Lupo, "Chase Image-Enables NY Wholesale Lockbox Facility with VICOR Technology" Press Release, Chase Manhattan Bank, Aug. 31, 1999.

Anonymous, "Chase offers image lockbox for Europe" Bank Systems &Technology, col. 34, issue 8, p. 37, Aug. 1997.

Lamond, Keith, Credit Card Transactions Real World and Online, http://www.virtualschool.edu/mon/ElectronicProperty/klamond/credit_card.htm, pp. 1-17, printed Jul. 8, 2005.

Anonymous, "Crestar to Introduce New Advanced Cash management System Based on IA Corp. Software . . . " Business Wire, Oct. 28, 1996.

Matyas, Stephen M., Digital Signatures—An Overview; pp. 87-94, (1979).

Friis, M. William; Goodbye to paper?; ABA Banking Journal, acs01037874, Mar. 1989.

Anonymous, "IA Corp. Announces New CheckVision Products; New CheckVision Archive Software Supports Short- and Long-Term Check Image Archival With Dynamic, Multi-Tiered Migration" Business Wire, Apr. 1, 1996.

Anonymous "IA Corporation Becomes a Major Player in Image-Based Cash Management Solutions" Business Wire, Nov. 24, 1995.

Anonymous "IA Announces installation at QuestPoint of first client/server cash management system with check image storage compatible with IBM, NCR and Unisys" Business Wire, May 29, 1997.

Anonymous "IA Presents New Advanced Cash Management Software at TMA to Link Banks and Their Corporate Customers . . . " Business Wire, Nov. 18, 1996.

Anonymous "IA's RemitVision Adopted by Harris Bank for CD-ROM and Online Customer Viewing of Check and Remittance Documents; Continues banking industry trends to use image-based processing as strategic weapon and increase online customer access to bank records" Business Wire, May 28, 1996.

Fitch, "Image technology brings lockbox breakthroughs" Corporate Cashflow Magazine, vol. 16 No. 9, p. 16, Sep. 1995.

Andersen Consulting, Image-based transaction processing; The banking industry's challenge for the 1990s and beyond; acs01039270, (1989).

Tauhert, "Lock Box Solutions reengineer Payments" Insurance & Technology, vol. 21 No. 8, p. 22, Aug. 1996.

Mead, Wendy S.; Two Banks' Imaging Deals Target Fee Revenue Increases; The American Banker; acs01039019, May 9, 1997.

Moyer, Liz; Bank of Montreal to Install Imaging System by Unisys for Retail Lockbox Services; The American Banker; acs01039023, Oct. 22, 1996.

Moyer, Liz; KeyCorp joins trend to check imaging for lockbox; The American Banker; acs01039004, Aug. 23, 1996.

Anonymous, "NCR introduces 7780 item processing system; image-based system scans and reads documents" Business Wire, Mar. 11, 1992.

Marjanovic, "NationsBank Offers Lockbox Imaging" American Banker, vol. 160, No. 126, p. 20, Jun. 1995.

NationsBank Rolls Out First Wholesale Lockbox Imaging Item Processing Report, Potomac, p. 1, Aug. 3, 1995.

Shannon, "New lockbox platform due out at NationsBank" Bank Systems & Technology, vol. 35, Issue 2, p. 38, Feb. 1998.

Armstrong, Douglas, Norwest cases difficulty of Interstate banking Bank's customers may use the same account number at any branch, Milwaukee Journal Sentinel, Oct. 12, 1995.

Maturi, Richard, Personal Finance; When you Need to Send Cash in a Flash, The New York Times, Sep. 25, 1988.

Buckley, JP et. al., Processing Noisy Structured Textual Data Using a Fuzzy Matching Approach Application to Postal Address Errors; XP-001132075; pp. 195-205 (11 pages); Dec. 2000.

Schutzer, Daniel; Get ready for electronic commerce; ABA Banking Journal; acs01038994, Jun. 1995.

Jensen, Business Publications: BNET, Topic: RSS Feed, U.S. Bank Effectively Manages Complexity; acs01039402; May/Jun. 2006.

Jensen, Business Publications: BNET, Topic: RSS Feed, U.S. Bank Effectively Manages Complexity; acs01039398, May/Jun. 2006.

Jensen, Business Publications: BNET, Topic: RSS Feed, U.S. Bank Effectively Manages Complexity; acs01039400, May/Jun. 2006.

Terrie Miller and Henry Yan, When Custody Governs, Benefits Canada, Toronto, vol. 22, Issue 2, p. 33, 5 pages, Feb. 1998.

Anonymous, Wholesale lockbox imaging, ABA Banking Journal, Feb. 1, 1993.

Anonymous, Computers & Operations, The Payments System gets a New Image, Mar. 1990.

Anonymous, Business Wire, State of Minnesota using AT&T Imaging Solution to Reenginer Sales Tax Paying Process: Department of Revenue Aims to Make Filing Sales Tax Forms Easier, acs01039027, Apr. 1994.

Anonymous, Business Wire, DMP and IMR Partner to Develop Electronic Achiving Solution for Wholsale Lockboxes Remittance Processing, acs01039040, Mar. 24, 1998.

Terrie Miller and Henry Yan, When Custody Governs, Benefits Canada, Toronto, Feb. 1998, vol. 22, Issue 2, p. 33, 5 pages.

Neil B. Murphy, "The Future of Banking in America: The Effect on U.S. Banking of Payment System Changes", FDIC Banking Review, vol. 16, No. 2, 2004.

Annual Report Pursuant to Sectin 13 or 15(d) of The Securities Exchange Act of 1934, Form 10-K, Intelidata Technologies Corporation, Fiscal Year Ended Dec. 31, 2001.

Blockbuster running test of a stored value card, The American Banker, Sep. 1, 1995.

CESNaBANCO introduces stored value card technology blockbuster video is first merchant partner.

Card Flash Daily Payment Card News, www.cardweb.com, printed Sep. 23, 2004.

Anonymous, Chase Manhattan introduces new FEDI payables product, ProQuest document ID: 7806951, ISSN/ISBN: 02686635, May 1995.

Bills, Chase Pact Done, What's Next for Web Vendors?, The American Banker, Technology Section, Jun. 3, 2002, p. 23.

Reinbach, Chase steps up treasury system, ProQuest documednt ID 8723558, ISSN/ISBN: 10459472, Nov. 1995.

Anonymous, Chasing the global trend, Cash Management News, proQuest document ID 9319923, ISSN/ISBN: 02686635, Dec. 1995.

Malhotra, Clearing House Enumerates e-Payments Ills, The American Banker, vol. 167, No. 154, Aug. 23, 2002.

Marjanovic, Corporate Services: Chase Gears Up Global Payments System Series: 16, The American Banker, vol. 160, Issue 174, Sep. 11, 1995, p. 41.

Gluck, Creating a Global Cash-Management Game Plan, Bank Systems & Technology, Feb. 1997, p. 28.

Lamond, Credit Card Transactions Real World and Online, Paying by Credit Card-Real World and Online, http://www.virtualsehool.edu/mon/ElectronicProperty/klamond/credit, printed Jul. 8, 2005, 17 pages.

Du Pont's Electronic Payments, Corporate EFT Report, v9, n1, Dialog file 636, Accession No. 01066902, Jan. 11, 1989.

Carreker, Electronic check presentment: Capturing new technology, http://proquest.umi.com, Banking Management, Rolling Meadows: vol. 71, Issue 2, Mar./Apr. 1995, p. 32, 5 pages.

Fidelity Helps Fund Sellers Trim the Taxes They'll Owe, The Wall Street Journal, Nov. 7, 2002.

First Data markets stored-value cards, Cards International, Jan. 30, 1996, p. 5.

Norris, First data unit develops blockbuster cash card, Omaha World Hearld Sunrise Edition, Business Section, Jan. 19, 1996, p. 16.

Harsh Truth: Your Investments Likely Won't Make Any Money.

Money, Initial Launch to 200 Credit Unions, USA Today.com, Jun. 27, 2002.

Decovny, Net Scope, Banking Technology, May 1997.

Nokia Announces the World's First NFC Enabled Mobile Product for Contactless Payment and Ticketing, PRNewswire, Feb. 9, 2005.

Goode, On Profit, Loss and the Mysteries of the Mind, The New York Times, Nov. 5, 2002.

Anonymous, Operating in a multi-currency environment, ProQuest document ID 9215937, ISSN/ISBN 09589309, Oct. 1995.

Maher and Troutman, Payor's Prescription for Painless Migration to Electronic Healthcare Payments and Remittance Advices, PNC Bank, Dec. 2001.

Press Release, Mar. 5, 2004, Payment Data Systems Files Patent on Debit Card Payment Solution, American City Business Journals, Inc., Mar. 5, 2004.

Maher and Troutman, Provider's Prescription for Painless Migration to Receipt of Electronic Healthcare Payments and Remittance Advices, PNC Bank, Dec. 2001.

Anonymous, Systems spell change for foreign exchange, Global Investor, ProQuest document ID 1056152B, ISSN/ISBN: 09513604, Nov. 1996.

French, Tech Stocks: Market Movers, Investors Worry CheckFree Being Chased from Its Own Game, http://www.thestreet.com, Jun. 20, 2002.

Technology, In Brief Wachovia-InteliData Deal, May 7, 2002.

Zuckerman, The Hedge-Fund Craze, The Wall Street Journal, Jun. 12, 2002.

McDonald, The Stars in the Sky Flicker, and Fund Stars Do the Same, The Wall Street Journal, Jan. 15, 2003.

Anonymous, Visa & Carnegie Mellon Plan Online Payment Scheme, Newsbyte News Network, Feb. 15, 1995.

Financial News, Wells Fargo Rolls Out Nationwide Lockbox Check Conversion, PR Newswire Association, Apr. 22, 2003.

Dialog file 20, #10279554; Offer: Book Yourself Free Cassettes; Mar. 25, 2000; Birmingham Post, p. 16.

* cited by examiner

METHOD AND SYSTEM FOR FACILITATING NETWORK TRANSACTION PROCESSING

CROSS-REFERENCE TO RELATED APPLICATIONS

This patent application is a is a continuation of U.S. patent application Ser. No. 11/137,407, entitled "Method and System For Facilitating Network Transaction Processing," filed May 26, 2005, which is a continuation in part of U.S. patent application Ser. No. 10/874,227 (now abandoned), entitled "Method and System for Transaction Decision Making" filed Jun. 24, 2004, which are hereby incorporated by reference herein in their entirety.

FIELD OF THE INVENTION

The present invention relates generally to transaction processing and, more particularly, to a method and system for facilitating transaction processing for a network of banks, financial institutions and/or other participants.

BACKGROUND OF THE INVENTION

Check conversion generally refers to a payment that begins with a paper check and ends as an electronic debit. The paper check may be truncated/converted into an electronic debit entry early in the check handling cycle for subsequent electronic processing. Currently, checks may be converted using Automated Clearing House (ACH) payment system, ATM networks or other mechanisms. Other clearing channels may include Image Replacement Document (IRD), image exchange, and other channels. As a result, the efficiencies of electronic payments are realized while customers still continue to write paper checks.

Currently, various electronic payments, such as automatic payroll deposits and debit card purchases, may be handled and processed. As a result, corporations and consumers can reduce or eliminate the use of paper checks to make routine and other payments. Examples of electronic payments include salaries, consumer and corporate bill payments, interest and dividends, and Social Security and other entitlement programs.

Many entities, including corporations, have been able to realize significant savings by collecting recurring consumer payment obligations by debiting consumers' bank accounts electronically after obtaining approval of the bill payer to debit his or her bank account periodically for the amount owed. A consumer or a corporation can make an electronic credit payment instead of issuing a paper check.

As more banks and other entities participate in various electronic payment systems, additional requirements may be implemented for each receiving entity. For example, different recipients may implement different mechanisms for identifying, receiving and/or processing electronic payments. Further, different banks may implement different electronic payment requirements. These inconsistencies and specific requirements may lead to errors and inefficiencies in transmitting and receiving electronic payments. Such errors and inefficiencies will inevitably lead to delays and higher costs. Currently, each settlement channel has its own settlement accounting system, resulting in various inefficiencies and duplicative efforts due to the support of multiple accounting systems.

In the credit card industry, the concept of "on-us" items refers to checks drawn on the same bank that is used by the payee to cash the check or deposit the proceeds. Payment is deposited at the same financial institution on which it was drawn or written. Thus, these items are not cleared between institutions. As a result, savings in cost, time and/or other efficiencies are realized. After a check is deposited at a local bank, the local bank may transport the check to a processing center where the checks are encoded and sorted.

Typically, a sorter is used to separate on-us documents from transit documents at a first pass. A traditional sorting process may involve a bank sorting paper checks according to individual member banks, and after the sorted checks are passed to individual member banks, the member bank further sorts the checks to support a direct send, which may include a single transmission representing a single bank's transactions. The sorter may capture MICR data and sort the documents into groups according to individual customer accounts. Thus, on-us documents may be electronically transmitted and quickly posted to a customer's account. Generally, banks receive their on-us files for posting from many different sources. For example, a bank may receive all their paper checks and/or other payment items, sort out those items they want to clear, and processes their own in-clearings. In-clearing documents are typically non on-us documents received from other banks or clearing facilities. Documents identified as transit items are generally dispatched and settled through a third party settlement agency. Third party settlement agencies may include Federal Reserve, Clearinghouse Banks, and/or other various entities and organizations that require additional time and fees. Each correspondent bank is responsible for all their own settlement functions, as well as any check image capturing, archiving, etc.

In view of the foregoing, it would be desirable to provide a method and system for settlement processing which overcome the above-described inadequacies and shortcomings.

SUMMARY OF THE INVENTION

According to an exemplary embodiment of the present invention, a computer implemented method for facilitating settlement processing within a network of financial institutions comprises receiving one or more payment items from a plurality of payment entities, at a centralized agent, wherein the one or more payment items comprise one or more electronic images and paper instruments; aggregating the payment items into one or more categories; identifying a payee financial institution and a payor financial institution for each payment items, wherein the payee financial institution and the payor financial institution are different; determining whether the payee financial institution and the payor financial institution are within the network of financial institutions; for the payee and payor within the network, determining at the centralized agent a settlement path within the network of financial institutions for each payment item; and for the payee and payor that are not within the network, forwarding the payment items to a third party settlement entity by the centralized agent for settlement processing.

In accordance with other aspects of the exemplary embodiment of the present invention, the categories comprise one or more of image clearing files and image cash letters; the categories comprise payment entity; the settlement path comprises one or more of IRD, ACH, ARC, ECP, posting to a consumer account, wire transfer and data archive; archiving payment data associated with each payment item; providing access to data specific to payment items through an interface provided by the centralized agent; the interface is customized based on user specific criteria; the network of financial institutions comprises a combination of banks and credit unions; a non-network entity accesses the centralized agent for data exchange with at least one entity within the network; sorting the payment items into on-us items and transit items; and a payment entity leverages the centralized agent's infrastructure for processing payment items.

According to an exemplary embodiment of the present invention, a computer implemented system for facilitating settlement processing within a network of financial institutions comprises a receive module for receiving one or more payment items from a plurality of payment entities, wherein the one or more payment items comprise one or more electronic images and paper instruments; an aggregate module for aggregating the payment items into one or more categories; a decision module for identifying a payee financial institution and a payor financial institution for each payment items, wherein the payee financial institution and the payor financial institution are different and determining whether the payee financial institution and the payor financial institution are within the network of financial institutions; and a settlement module for determining a settlement path within the network of financial institutions for each payment item for the payee and payor within the network and forwarding the payment items to a third party settlement entity for settlement processing for the payee and payor that are not within the network; wherein the receive module, the aggregate module, the decision module and the settlement module reside at a centralized agent.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT(S)

A system and process for improving efficiency of processing payment items is described. According to one exemplary aspect, the system and process is directed to facilitating network transaction processing.

Figure 1:
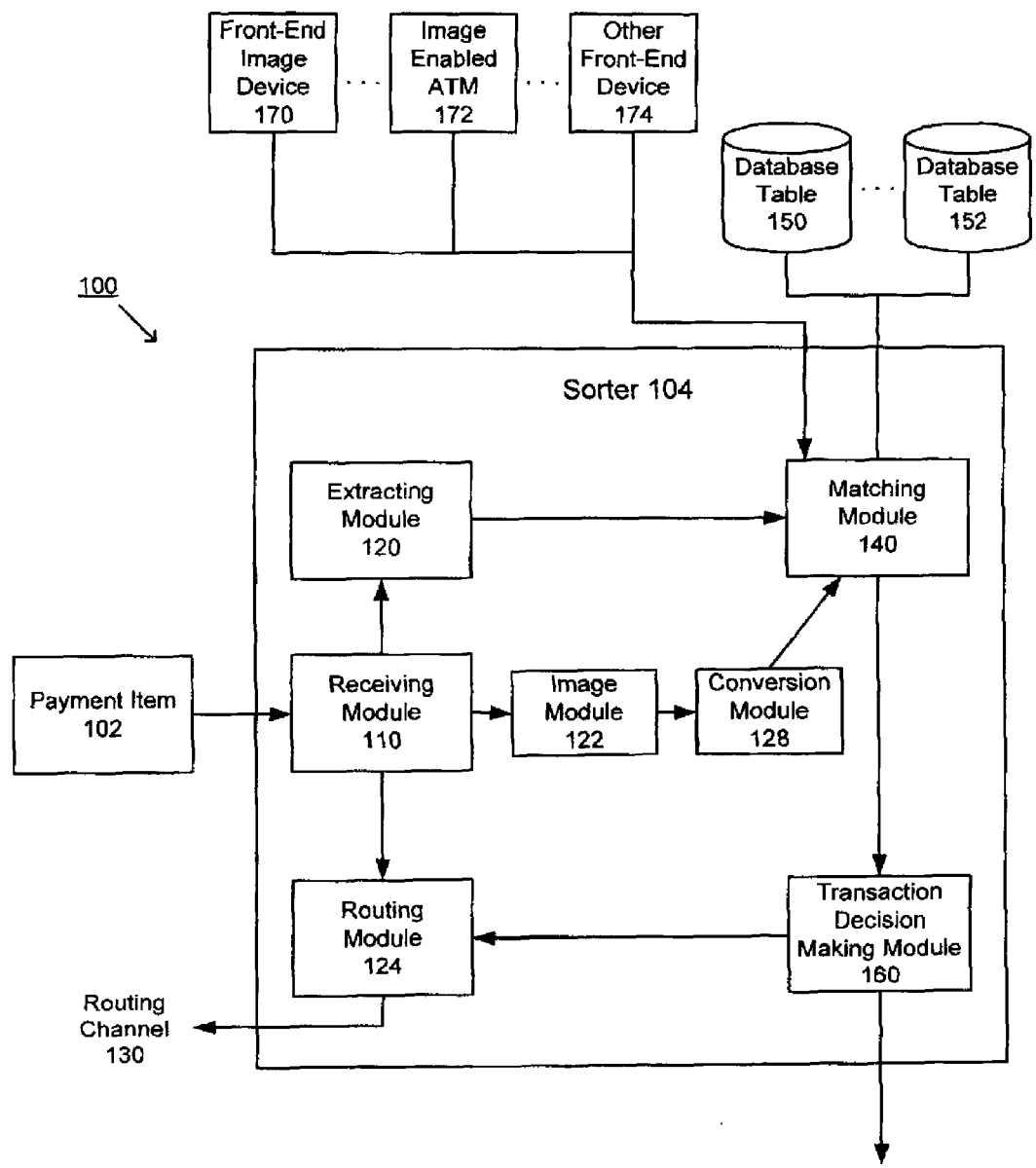
FIG. 1 is an exemplary system illustrating transaction decision making, in accordance with an embodiment of the present invention.

FIG. 1 is an exemplary system illustrating transaction decision making, in accordance with an embodiment of the present invention. System 100 illustrates an exemplary environment for processing payment items. A payment item 102, such as a check, may be received at Sorter 110. Payment items may include checks, cash tickets, deposit tickets, commercial paper and other paper instruments. The payment item 102 may contain information, such as a payee, legal amount (e.g., amount written), courtesy amount (e.g., numerical representation of legal amount), signature, memo, other identifiers and/or other data. Pre-printed information may include payor identification information, such as payor name, payor address, payor telephone, and other information. Depending on the type of payment item, different data may be included and/or printed. In the example of a check, the payment item may include a Magnetic Ink Character Recognition (MICR) line, which contains routing number, account number, MICR amount, check number, and/or other electronically readable numbers and/or codes. A pre-printed commercial check may include a MICR dollar amount. In addition, payment items may also include serial numbers (or other identifiers). For example, serial numbers may represent a business check, store identifier, check numbers, process codes, transaction codes and/or other information. Other identifiers may include field numbers, position numbers which may be used to earmark checks as truncated items, expedited returns, IRD or other types of payment items.

Sorter 104 may include various modules for performing functions associated with capturing an image from the payment item, reading electronic information, determining an appropriate route and/or performing other related functions. Sorter 104 may include Receiving Module 110, Extracting Module 120, Image Module 122, Conversion Module 128, Routing Module 124, Matching Module 140, Transaction Decision Making (TDM) Module 160 and/or other module(s). The modules of Sorter 104 may be further combined, duplicated and/or separated. The modules may also be provided across multiple sorters and/or other devices. Sorter 104 may communicate with various databases, sources of information, front end devices, and/or other modules. For example, Matching Module 140 may communicate with one or more databases 150. Communication may be established through various modes of electronic communication, including Internet, Intranet, Ethernet, wireless communication and/or other modes of communication.

Sorter 104 may be included in or connected to an image enabled front-end device (e.g., ATM, teller or other remote device), an image machine for commercial customers, and/or other type of device. For example, at a front counter, a teller or other entity may capture transaction image and data during a customer transaction process. In another example, a banking center personnel may capture transaction image and data subsequent to the customer transaction process. ATM image capture may provide the ability to capture transactions made at an ATM (or other similar interface). Image and data from a customer transaction process may be captured via other processes as well.

Sorter 104 may be located at or connected to a regional processing center, lockbox locations and/or other location. Lockbox locations may include a national retail lockbox, wholesale lockbox, regional retail lockbox and/or other types of lockbox locations. National retail lockbox may include a check collection system in which a bank or third party receives, processes and deposits a company's mail receipts. Wholesale lockbox may include a moderate number of large dollar remittances, with varied documentation, usually from corporation to corporation. Regional retail lockbox may include a local processing site rather than a national or network processing site. In addition, Sorter 104 may represent an image capture device located at a business location.

Receiving Module 110 may receive the payment item. Receiving Module 110 may receive the actual physical payment item. In another example, Receiving Module 110 may receive an image of the payment item and/or other electronic data identifying or describing the payment item.

Extracting Module 120 may extract electronic data from the payment item. Electronic data may include data from the MICR line. For example, Extracting Module 120 may read the MICR line of the payment item that contains the routing number, account number, check number and in some cases, the MICR dollar amount as well as other electronic information.

Image Module 122 may take one or more images of the payment item. The image may include a front image of the payment item, a back image of the payment item, a portion of the payment item or other image. For example, the image of a front side of the payment item may include the printed name, address, date, payee name, courtesy amount, legal amount, memo line and/or signature. An image of a back side of the payment item may include endorsement information, instructions, processing stamps, and/or other information.

Conversion Module 128 may convert the image from Image Module 122 to electronic data. For example, the image may be converted by optical character recognition (OCR) or other method into electronic information.

Routing Module 124 may route the payment item to an appropriate channel or destination as to be determined by a Transaction Decision Making Module 160. The actual physical payment item may be received at Routing Module 124 and routed to an appropriate channel 130. Possible routing options may include substitute check (e.g., IRD, etc.), destroy product, process product, check conversion (e.g., ACH, ECP, image presentment, etc.), PoS, wire conversion, return to presenting bank, and/or other routing options.

Matching Module 140 may compare the electronic data from the MICR line from Extracting Module 120 and the electronic data from the image of the payment item from Conversion Module 128, Matching Module 140 may verify data from the payment item as well as data from other sources of information, external and/or internal sources. For example, Matching Module 140 may verify the MICR amount, if available, with the legal amount and/or courtesy amount. In another example, the legal amount and the courtesy amount may be verified. Other matching capabilities may include verifying name, payee name, date, address, signature and/or other information.

Matching Module 140 may verify various information concerning the payment item. For example, one or more databases 150, 152 may be accessed to determine whether the MICR information is valid, whether there is a potential for fraudulent activity, whether the MICR number should be altered and/or other determination. According to another example, an account table or other resource may be accessed where the account table maintains positive and negative account files. For example, the account table may determine whether an account number is associated with a closed account or other negative account. The account table may also identify stop payment items, do not pay items and other special instructions associated with the payment item, account number and/or other identifier. The account table may also validate legitimate accounts and other authorized payments and/or instructions. Other data may be verified at Matching Module 140.

According to another example, certain data may be extracted from the payment item for targeting potential customers and/or other business objective. This process may occur at the Matching Module 140 and/or Extracting Module 120 or other component within Sorter 104. For example, a payment item may be a check that is issued by a first bank and made payable to a second bank, as the payee. The first bank may use this information to determine that the payor, who may be a retail bank customer, is using the second bank's credit card. This information may then be used to send an offer (e.g., promotion, advertisement, etc.) to the retail bank customer in an attempt to acquire business. The offer may be sent as an electronic offer (e.g., email, etc.), mailer or other type of communication. Other business objectives may be achieved by gathering data. Additional information may be gathered to further target or customize the offer.

TDM Module 160 may determine how to process the payment item, while the payment item is in Sorter 104. TDM Module 160 may represent a sophisticated rules engine that accesses account information, payee information, banking rules and/or other information in performing transaction decisions.

TDM Module 160 may also determine an appropriate form of processing. For example, TDM Module 160 may determine whether the payment item is to be expedited. Under certain circumstances (e.g., check for over a threshold amount, such as $10,000), the payment item may be settled an alternate method, such as conversion to a substitute check, requirement for multiple endorsements, etc. TDM Module 160 may also determine whether the payment item should be processed as a paper item through regular or other channels. TDM Module 160 may determine whether the payment item should be converted into an image where the paper version is destroyed. In addition, TDM Module 160 may determine whether to charge against a credit line, the image data or other data may be archived, perform an image exchange, convert to an image exchange, perform an on-us transaction and other determination. An on-us transaction may include any electronic banking transaction in which the acquiring bank and the issuing bank are the same institution. In some instances, human intervention may be appropriate. For a wire transfer, a manual review may be initiated when the amount is over a threshold amount (or other condition is satisfied). A verification process, fraud review and/or other process may be applied for certain types of transactions. Other processing channels may be determined and initiated.

According to various embodiments of the present invention, TDM improves float, reduces transportation cost of paper checks or other paper payment items, and is flexible for the customer, bank processing and/or other participant. TDM may be deployable out to branch locations, lockboxes, ATMs, cash vaults, regional processing centers and/or other locations and devices.

With scanners at remote locations, such as ATMs, branch locations, a payment item may be scanned and TDM may automatically decide on whether the paper payment item can be destroyed. According to another embodiment of the present invention, front-end image device 170, image enabled ATM 172 and other front-end device 174 may scan an image of the payment item or other data associated with the payment item. Front-end image device 170 may include teller machines, capture devices, and/or other point of sale terminals. Image enabled ATM 172 may include devices for validating transactions (e.g., whether funds are available, whether other criteria are met, etc.). In this exemplary embodiment, an image of the payment item may be presented rather than the paper payment item for payment. In another example, another financial institution may transmit a file of check images and data for posting to a Demand Deposit Account (DDA) accounts. As a result, the paper payment item is not received at Receiving Module 110. For example, a front-end image device may be part of a remote image enabled ATM 172.

In another example, a teller at a branch location may enter information, such as payment amount, into an electronic file. The paper payment item may be received at Sorter 104 and later matched with the electronic file with data associated with each paper payment item. For example, as the paper payment item is received at Receiving Module 110 or other module of Sorter 104, electronic data may be matched with the paper payment item at Matching Module 140.

Figure 2:
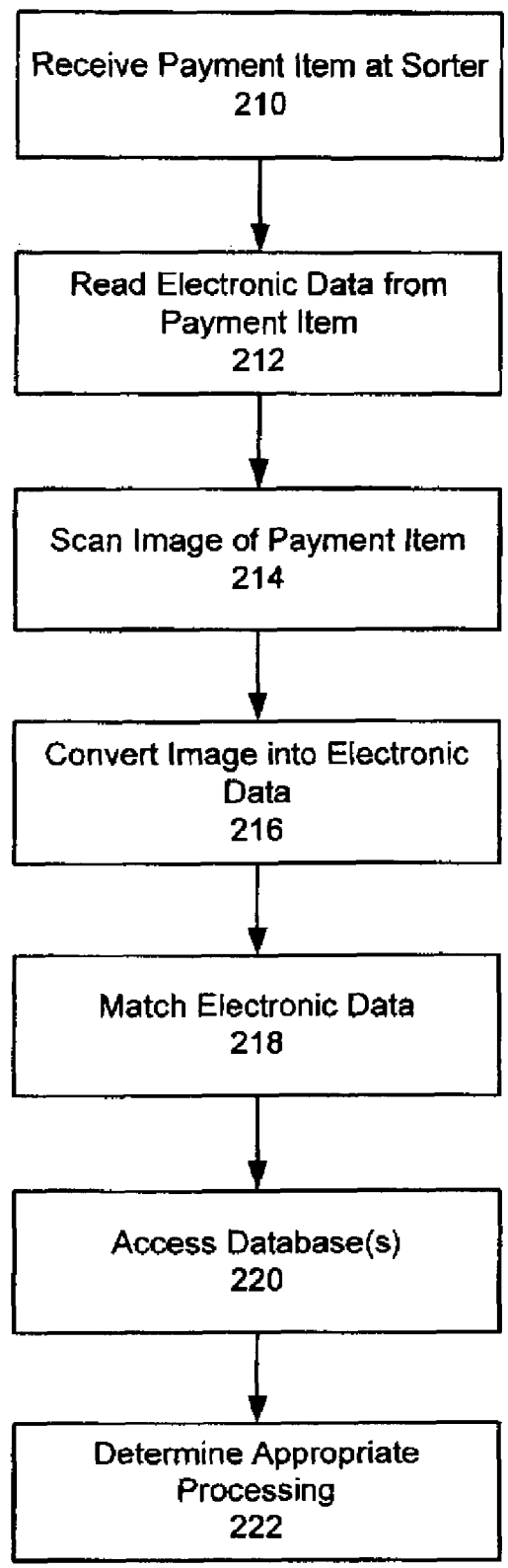
FIG. 2 is an exemplary flowchart illustrating a method for transaction decision making, in accordance with an embodiment of the present invention.

FIG. 2 is an exemplary flowchart illustrating a method for transaction decision making, in accordance with an embodiment of the present invention. At step 210, a payment item may be received at a sorter. The sorter may be local or remote. At step 212, electronic data from the payment item may be scanned or otherwise read by the sorter. Electronic data may include MICR line, routing number, account number, check number, MICR dollar amount and/or other data from the payment item. Depending on the type of payment item, different electronic data may be scanned at the sorter. At step 214, an image of the payment item may be scanned. The image may be the front of the payment item, back of the payment item and/or a portion of the payment item. In another example, an image of the payment item or other data may be received from a front-end device. At step 216, the image may be converted to electronic data. For example, the conversion may be accomplished by OCR or other method.

At step 218, the electronic data from the payment item at step 212 and the electronic data from the image at step 214 or 216 may be matched or otherwise compared. For example, this may involve verifying MICR amount, name, address, signature and/or other data associated with the payment item. In addition, information regarding the payment item, payor, payee, transaction, etc. may be extracted for business applications, such as promotions, targeted advertisements, etc. If non-matching is determined, business rules may be applied, which may include returning the payment item, marking the payment item with an indication of a non-match and/or other action.

At step 220, one or more databases and/or other sources of data may be accessed to verify and/or confirm additional information. For example, MICR information may be verified, potential fraudulent activity may be determined, alternations to the payment item may be identified and/or other determinations may be made. For example, fraudulent activity may be determined by assessing whether account information is valid. In addition, positive and negative account information may be accessed to verify valid accounts.

At step 222, appropriate processing for the payment item may be determined. For example, a transaction decision making module may determine whether the payment item should be expedited, processed via channels, etc. Other processing determinations may be performed. While the process illustrated in FIG. 2 discloses certain steps performed in a particular order, it should be understood that the present invention may be practiced by adding one or more steps to the process, omitting steps within the process and/or altering the order in which one or more steps are performed.

Figure 3:
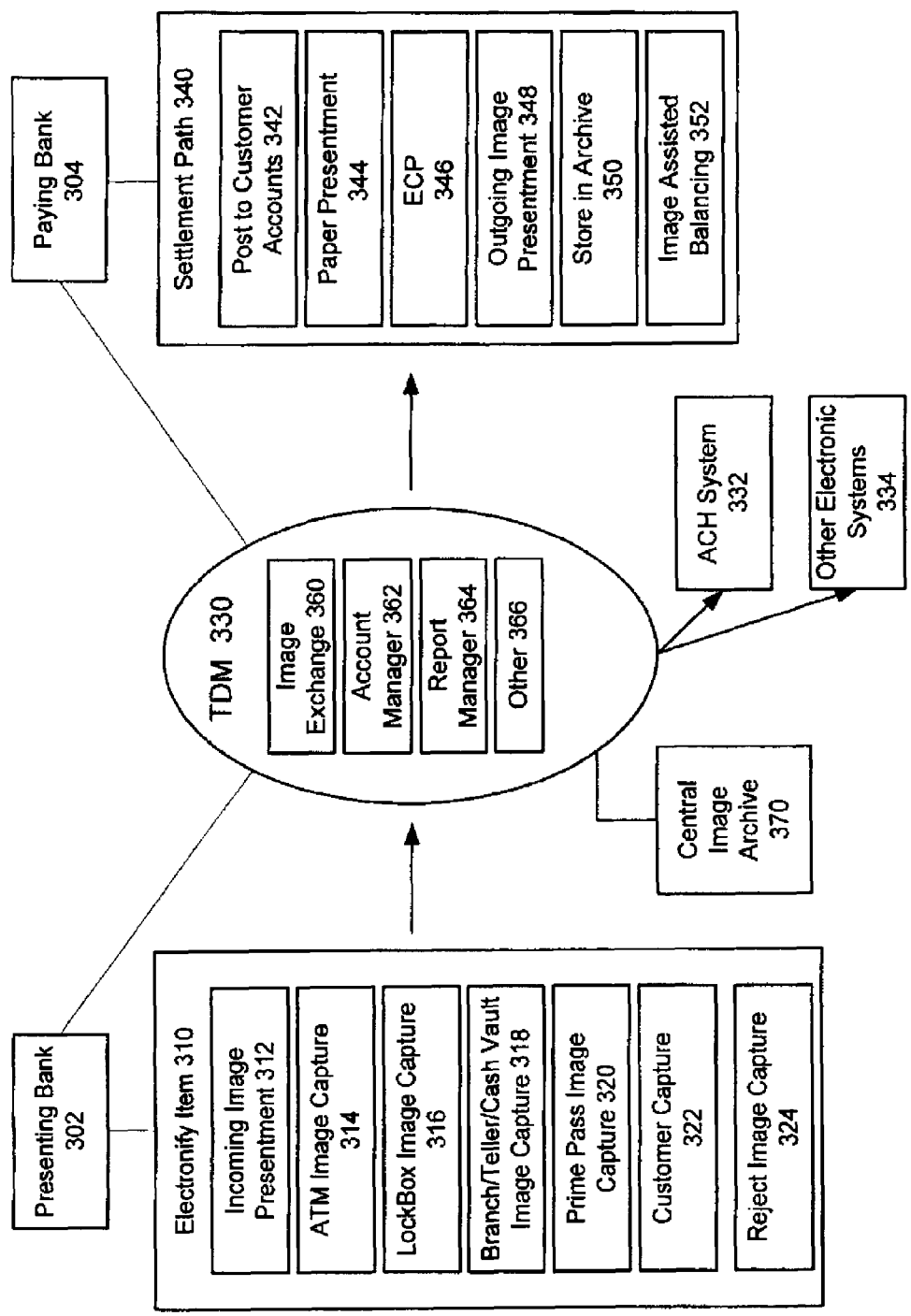
FIG. 3 is an exemplary system illustrating transaction decision making, in accordance with an embodiment of the present invention.

FIG. 3 is an exemplary system illustrating transaction decision making, in accordance with an embodiment of the present invention. According to an aspect of an embodiment of the present invention, TDM 330 may electronify paper check processing and deliver a flexible electronic transaction processing system for check image, which may be leveraged across multiple payment types. A payment item may be electronified as it is received, as shown by 310. TDM 330 may route the truncated checks and images for settlement and/or image archives, via a settlement path 340. The payment item may be converted to electronic format at a front-end interface or immediately upon receipt at the sorter. TDM 330 may determine appropriate processing for the payment item, including settlement, image archiving and/or other type of processing. For example, the payment item may be converted to an ACH system or other electronic systems. Other options may include image assisted balancing, posting to customer accounts, electronic check presentment (ECP), storing in an archive (e.g., branch, customer service desktops, image and Internet settlements, CD-ROM and other storage options) and/or other settlement path.

Electronify item 310 represents acquisition of check, data and image where items are captured at an initial point of entry. Electronify item 310 may involve various types of data capture, such as Incoming Image Presentment 312, ATM Image Capture 314, LockBox Image Capture 316, Branch/Teller/Cash Vault Image Capture 318, Prime Pass Image Capture 320, Customer Capture 322 and Reject Image Capture 324. Other types of methods for capturing data may be implemented.

Incoming Image Presentment Capture 312 may involve presenting an image rather than the actual payment item for payment. For example, a check image may be presented rather than the paper check for payment. In another example, a financial institution may transmit a file of check images and data from another financial institution for posting to DDA and/or other accounts. Movement of paper is replaced with the transmission of images thereby streamlining a payment bank's posting process.

ATM Image Capture 314 may involve the ability to capture transactions made at an ATM. ATM transactions may be processed immediately as opposed to waiting for a courier pick-up and receipt of paper.

LockBox Image Capture 316 may include a National Retail Lockbox, Wholesale Lockbox, Regional Retail Lockbox and/or other types of lockbox services. A National Retail Lockbox may involve a check collection system in which a bank or third party receives, processes and deposits a company's mail receipts. Wholesale Lockbox may involve a moderate number of large dollar remittances, with varied documentation, usually from corporation to corporation. Regional Retail Lockbox may include a local processing site rather than a national or network processing site. Lockbox services reduce process cycle time and the number of times the check is physically touched.

Branch/Teller/Cash Vault Image Capture 318 may include front counter, back counter and other types of image capture. Front Counter may include the ability for a teller (or other representative) to capture transaction image and data during a customer transaction process. Back Counter may include the ability for banking center personnel to capture transaction image and data subsequent to the customer transaction process. Transaction integrity may be increased and timeliness of processing may be improved.

Prime Pass Image Capture 320 may involve capture of check and images at an initial point of contact. Image capture may be moved to the point of entry. Therefore, data is available within minutes rather than hours. Process cycle time and the number of times the check is physically touched may be reduced.

Customer Capture 322 may involve a customer capturing image and data of checks for deposit or clearing through a financial institution and transmitting a file along with delivery of a physical paper item. Productivity efficiencies may be realized through this capture.

Reject Image Capture 324 may involve identifying payment items that can not be process based on insufficient or improper data, payment items with bad images or data and/or other defective data. For example, payment items may include insufficient data, which may mean an invalid account, missing information (e.g., no signature), questionable data, etc. In another example, payment images may be inadequate, such as poor quality of image data, etc.

According to one example, TDM 330 may provide validation and processing to a settlement channel. TDM 330 may process transactions through one or more databases which identify and optimally route the information. In addition, TDM 330 may provide payment decision assignment. TDM 330 may provide account validation, exception item identification, image assisted balancing, recognition technology, flexible settlement channeling, flexible data extract processing and/or other functions.

According to an exemplary embodiment, TDM 330 may include a Central Image Archive 370, Inter-Bank Image Exchange 360, Account Manager 362, Report Manager 364 and/or other functionality, represented by 366. TDM 330 enables banks, e.g., Presenting Bank 302, Paying Bank 304 and/or other participants, to reduce clearing costs, expedite processing times and reduce fraud losses. Therefore, funds, payment information and/or other data are provided more quickly to consumers. While a single archive is shown, multiple archives may be implemented, which may be located at various locations.

Image Exchange 360 may receive requests for data from Presenting Bank 302 where data may be uploaded to Central Image Archive 370. For example, Presenting Bank 302 may upload ECP data, check images and/or other information into Central Image Archive 370. ECP data may be reconciled to images to verify the existence of images for check items. Items with missing images may be flagged.

Notifications may be passed between Presenting bank 302, Paying Bank 304 via Image Exchange 360. Upon a successful load of ECP and image data into the Central Image Archive 370, the Presenting Bank 302 and Paying Bank 304 may be notified of their availability for retrieval. Other conditions may trigger notifications. In addition, other entities may be notified.

Image Exchange 360 may facilitate retrieval of data from Central Image Archive 370 by Paying Bank 304. Data stored in Central Image Archive 370 may be updated via Image Exchange 360. Paying Bank 304 may retrieve ECP data, images and/or other information from TDM 330. Data retrievals may be manual, automatic and/or scheduled.

Account Manager 362 may provide various account functionality, such as fraud identification, positive pay, account reconciliation, return item notification. Fraud identification may use a customer provided file containing stop pay, closed account, account restricted and/or other data to raise an early alert before the paying bank receives the payment item, thereby avoiding the situation where the paying bank tries to process the payment item and post DDA, resulting in a returned item. Positive pay may interface to an account file containing check numbers (or other identifiers) issued by a participating bank, to positively identify commercial checks sent for payment. Items not on the account file may result in a notification and/or returned item, for example. Account reconciliation may provide reconciliation services, such as serial number verification. Return item notification may send images to the presenting bank, on behalf of the returning bank. Return item notification may interface with a customer provided exception file to process several high volume, high dollar exchanges, or other type of payment simultaneously.

TDM 330 may communicate with partner banks (and/or other entities) for sending and/or receiving data on customer account openings, customer account closing, stop-pays and/or other data and events. Thus, accounts and/or other data may be validated. Account validation may involve validating accounts, which may include internal and external accounts, by accessing relational account databases and/or other sources of information. Online, automated account validation may be provided which allows for instant (e.g., same day) resolution of invalid account items.

Exception item identification may involve accessing stop payment relational databases, exception item identification databases for internal and external accounts and compliance databases and/or other databases. Return item risks are reduced where instant identification of stop payments and suspected items may be realized.

Report Manager 364 may facilitate extraction of formatted reports. Reporting criteria may be specified. Report Manager 364 may monitor the flow of payments in and out and may further provide statistics on payments converted and dollars converted so that statistical trends may be identified.

According to another example, recognition software may be implemented at TDM 330 to systemically identify and resolve transaction differences. Transactions may be electronically created and retrieved. In addition, various inefficiencies may be reduced, such as posting errors. Posting and exception errors may be reduced thereby reducing overall risks. Recognition technology may include software identifying a payment item's courtesy amount by reading the courtesy box on a physical payment item (e.g., paper check); software identifying a payment item's legal amount by reading the written amount line on the physical payment item; and/or software identifying any alpha and/or numeric characters on the payment item, such as name, payee, signature, etc. Transaction integrity and fraud detection may be improved. In addition, data mining and new product revenue potential may be provided.

Flexible settlement channeling may involve settlement/decision channel determination, which provides for appropriate settlement channel based on customer preference, item value, time of day, and/or other factors.

Flexible data extract processing may involve providing posting files to internal and/or external entities, which provides for new product potential, intraday posting potential and simplifies online/automated interface to other process applications.

In accordance with an embodiment of present invention, TDM 330 may determine an optimal clearing and final settlement of the transaction items, via Settlement Path 340. Paper, images and/or data associated with the payment item may be routed to an appropriate settlement channel for presentment, conversion, posting to accounts, and/or other actions. For example, optimal channels may include posting to customer accounts without double counting; presenting the paper payment item where the paper is the presentment; presenting an electronic check where the paper remains the presentment; presenting an outgoing image where the image is the presentment; and converting to ACH which may involve ARC conversion and/or other channels.

Post to Customer Accounts 342 may involve posting transactions to a customer DDA, time deposit accounting (TDA), credit card, general ledger or other type of account. DDA may refer to a merchant bank account that is credited or debited for deposits, fees, adjustments, etc. By posting to customer accounts, online automatic account validation and correction of invalid account items may be available. Existing editing routines may be replaced with hard decision processes. For example, a demand account may include an over-draft protection where the account may be tied to a certain account, with one or more alternate accounts. Therefore, if a non-sufficient funds alert is detected, the funding may be supplied from an alternate designated account.

Paper Presentment 344 may involve presenting a paper payment item (e.g., paper check) for clearing and settlement processing.

Electronic Check Presentment (ECP) 346 may involve transmission of data files to a paying bank for editing with subsequent receipt of paper payment items for processing where the paper payment items may be destroyed within a time period (e.g., 60 days) of being imaged or ECP presented.

Outgoing Image Presentment 348 may involve multiple, intraday presentment of payment items via images where the paper payment item may be destroyed within a time period (e.g., 60 days) of being imaged or ECP presented. Incremental funds availability may be improved and return item risk may be reduced.

Store in Archive 350 may involve storing the images and/or data in various locations, including one or more databases, branch location, customer service desktops, image and internet settlement locations, CD-ROMs and/or other storage devices.

Image Assisted Balancing 352 may involve identifying differences and viewing a transaction as it occurs to rapidly resolve identified differences. Research and adjustment case load may be significantly reduced and transaction integrity may be improved.

Conversion to ACH system 332 may involve conversion from the paper payment item to an electronic ACH or other transaction. For example, a Reg CC item may be converted to a Reg E controlled transaction. Data may be converted to other electronic systems 334, as well.

An embodiment of the present invention implements the TDM infrastructure to allow a Bank or other entity to act as a centralized clearing house/routing agent for check payment and/or other processing. As discussed in detail above, the TDM aspect of an embodiment of the present invention provides for intelligent settlement processing. The Bank may have various member banks that send checks for processing. An embodiment of the present invention allows for network processing where a mixed cash letter and/or other payment items from Bank A of a network may be transferred by a Centralized Agent to Bank B of the network using internal network resources. For example, payment items (e.g., checks, etc.) may be settled by the Centralized Agent as between Bank A and Bank B without the need to route payment information to third party clearing agents, such as the Federal Reserve (e.g., for FDIC items), SVPCO, Endpoint Exchange, and so-called Viewpointe banks. This aspect of an embodiment of the present invention has the advantage of avoiding third party settlement agent fees, the savings of which may be shared between the Centralized Agent and the network banks. Further, faster settlement (e.g., typically same-day settlement) and other efficiencies may be realized.

For payment items received by the Centralized Agent which are not susceptible to network processing (e.g., where the paying bank and payee bank are not both members of a network), the Centralized Agent may act as an agent for third party settlement mechanisms, e.g., the Fed, SVPCO, etc. In addition, non-network banks and/or other entities may settle with any network bank through the Centralized Agent.

Thus, an embodiment of the present invention may provide the ability to perform network processing for all member banks. In addition, an embodiment of the present invention may provide a central agent as a single point of contact for all third party settlements for member and non-member banks and/or other participants. Another embodiment of the present invention may be directed to a decisioning process to determine whether incoming payment items (e.g., checks, etc.) are susceptible to network processing. If the payment items qualify, then network processing is performed. If the checks do not qualify, then routing to a third party settlement agent is performed through the Centralized Agent. Therefore, the Centralized Agent may perform both network and out-of-network processing depending on the identities of the payor and payee banks and/or other criteria.

Figure 4:
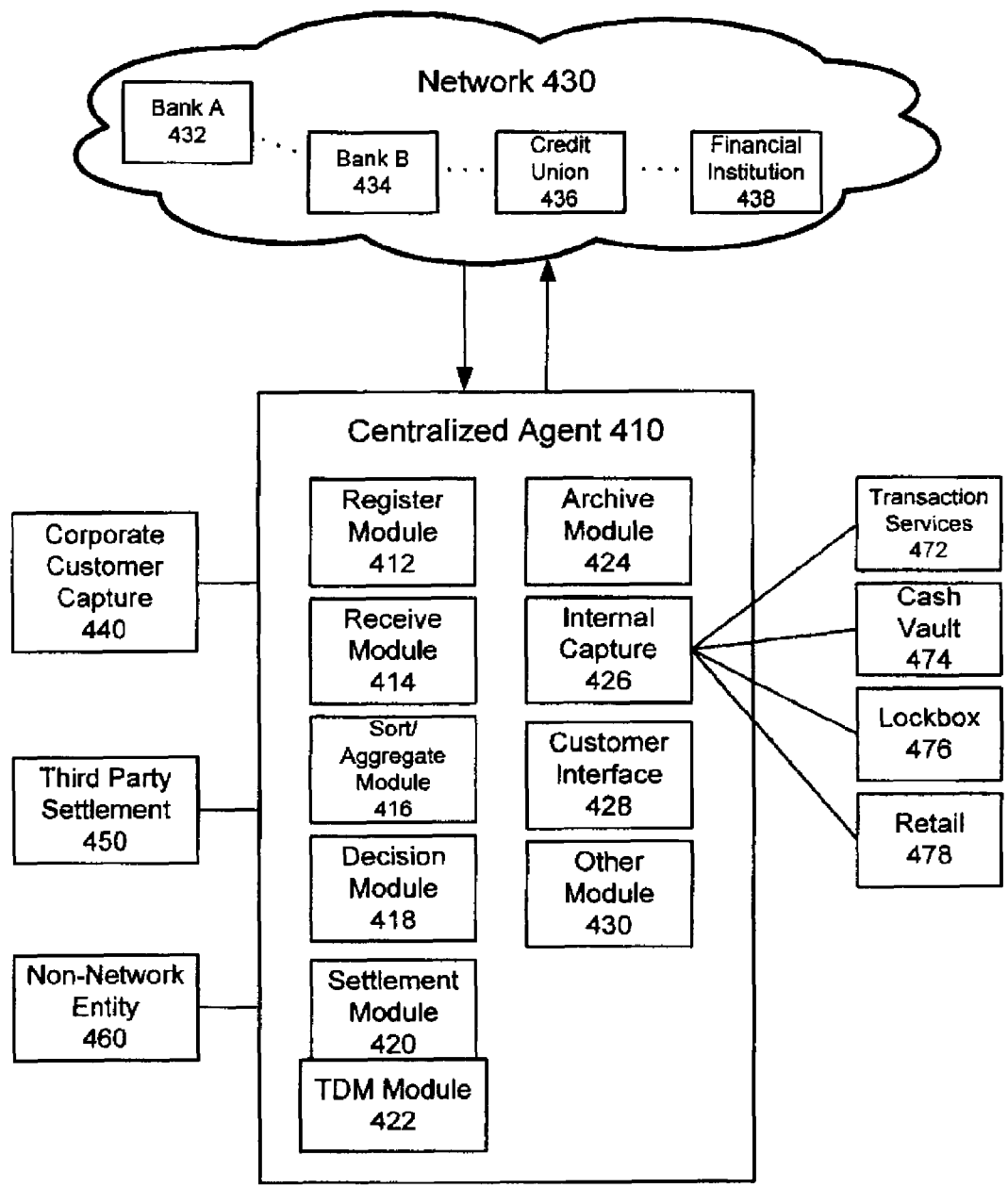
FIG. 4 is an exemplary system illustrating a settlement network, in accordance with an embodiment of the present invention.

FIG. 4 is an exemplary diagram of a settlement network, according to an embodiment of the present invention. Centralized Agent 410 may include a bank, financial institution, and/or other entity. Centralized Agent 410 may include various modules providing settlement processing functionality. For example, Centralized Agent 410 may include Register Module 412, Receive Module 414, Sort/Aggregate Module 416, Decision Module 418, Settlement Module 420, Archive Module 424, Internal Capture Module 426, Customer Interface 428 and/or other modules. Settlement Module 420 may include and/or be in communication with TDM Module 422, the details of which are discussed above. Internal Capture Module 424 may communicate with Transaction Services 472, Cash Vault 474, Lockbox 476, Retail 478 and/or other services, such as long term storage of data, images and/or other media (e.g., CD-ROM, Internet Access, Image Statements, etc.). While the modules are illustrated within a single system, other system architectures may be realized. For example, the modules may be further combined and/or separated. The modules may exist across multiple systems, located at the same or different locations. While the modules and other elements are shown as a single component, each component may be reiterated. As the system of FIG. 4 represents an exemplary embodiment, other variations may be realized.

Centralized Agent 410 may communicate with entities and/or other participants through various modes of communication, including Internet, wireless, and/or other forms of communication. Network 430 may include a network of banks, financial institutions, credit unions and/or other participating entities. For example, participants may include Bank A 432, Bank B 434, Credit Union 436, Financial Institution 438 and/or other entities within Network 430. Network 430 may support various transactions between and among banks and/or other participants. For example, banks within network 430 may support images, paper checks, returns, IRD/MICR, ARC/EFT, Debit and/or other types of transactions. Any participant within Network 430 may transmit payment items for settlement and/or other type of processing. Payment items may include checks, cash tickets, deposit tickets, commercial paper and other instruments. Other examples of payment items may include electronic data, such as images and/or other data. For example, according to one exemplary embodiment, a bank, such as bank 432, may transmit co-mingled cash letters to Centralized Agent 410 for processing. In return, Centralized Agent 410 may transmit image in-clearings posting files. Other communications may be transmitted depending on the various applications and/or options. For example, Centralized Agent 410 may notify customers, paying banks and/or other entities of incoming transactions and validation services, such as positive pay, account reconciliation plan (ARP), controlled disbursements, high dollar review, signature verification, etc.

For example, Bank A 432 may exchange transaction data (and/or other data) with Centralized Agent 410, Bank B 434, Credit Union 436, Financial Institution 438, etc. through network 430. Bank A 432 may exchange with any third party settlement entity 450 and non-network entities (e.g., non-network banks, etc.), represented by 460. Non-network entities 460, such as non-network banks, may exchange with Centralized Agent 410 and all members of network 430 through a single agent, the Centralized Agent 410.

At Register Module 412, banks and/or other participants may register with the Centralized Agent 410 (or other authorized entity) to join or otherwise participate in Network 430. For example, an agreement may authorize the Centralized Agent 410 to serve as a representative to image exchange networks, other networks and/or services supported by Network 430. For example, correspondent customers (e.g., network banks, etc.) and/or participants may have an agreement with Centralized Agent 410 to participate in image exchange, and/or other services. Register Module 412 may also include billing information. For example, network banks and/or other participants may be charged a fee for network services. Incentive programs may be implemented to encourage participation and to expand the network. Other network related programs may be implemented.

Receive Module 414 may receive payment items in various formats, electronic, paper, etc. Payment items may include paper checks, electronic images, etc. The payment items may be received from various network banks and/or other participants, within Network 430. In addition, out of network banks, represented by 460, may also use Centralized Agent 410 as the central point for settlement and processing. In addition, various entry points may be available for customers and/or other participants. For example, Corporate Customer Capture 440 may forward corporate payment items for settlement, which are received by Receive Module 414.

Sort/Aggregate Module 416 may aggregate the payment items into various categories for settlement. For example, the received payment items may be aggregated into categories for efficient processing. For example, payment items may be sorted by payor entity. Payment items may also be sorted by out of network and in network processing. In addition, payment items may be sorted into separate cash letters prior to depositing. Cash letters may be sorted by specific paying bank, location (e.g., country, city, etc.), dollar amount (e.g., high dollar group), fine sort, group sort, and/or other categories.

Decision Module 418 may determine whether a payee and payor are within Network 430. Payor identity may be obtained from the payment item itself. For example, from a check, MICR number or other identifier may indicate the payor bank. In addition, origination bank (e.g., payee) identification and payor bank identification may be identified. This identification information may be obtained from ACH, ANSI X9.37 record formats as well as other industry standards for transmission files.

Settlement Module 420 may determine an optimal settlement path. Settlement Module 420 may also include TDM module 422. As discussed in detail above, TDM module 422 may determine how to process the payment item. TDM Module 160 may represent a sophisticated rules engine that accesses account information, payee information, banking rules and/or other information in performing transaction decisions.

Archive Module 424 may provide archiving capabilities for banks within Network 430 and/or other participants. For customers to receive their items, a posting file for DDA systems and/or other systems, as well as archiving services for various items, including on-us and transit, may be provided. Archive Module 424 may also provide the ability to offer multiple-levels of archiving services to correspondents, including access for their customers.

Internal Capture 426 may capture transaction data from various sources, such as Transaction Services 472, Cash Vault 474, Lockbox 476, and Retail 478. Many other sources and/or lines of business may be permitted to access the system of an embodiment of the present invention with a diverse array of transaction types.

Customer Interface 428 may provide a secured online interface for users (e.g., customers, network banks, etc.) to access and review details regarding transaction processing and/or other information. Users may verify funds availability, processing status and/or other data. Users may view electronic images of payment items, including endorsements and/or other information. The interface may be customized by the user. For example, data that is displayed may be restricted to certain users based on their role, privileges and/or other criteria. Users may view exceptions, incoming returns and/or other data through the customer interface. The user may determine an appropriate action through the online interface. For example, users may indicate that certain items received should be returned to the originator of the item.

Centralized Agent 410 may communicate with various external entities, such as third party settlement 450, non-network entities 460, entry points, such as corporate customer capture 440, and/or other services and functions. For example, if the payee or payor are not within Network 430, settlement may occur through an external entity, such as a third party settlement entity 450. Non-network banks 460 may represent banks, credit unions, financial institutions and/or other entities that are not part of Network 430. Non-network banks may access Centralized Agent 410 to exchange with any network entity of Network 430 as well as any other participant associated with Centralized Agent 410, through a single point of entry.

Figure 5:
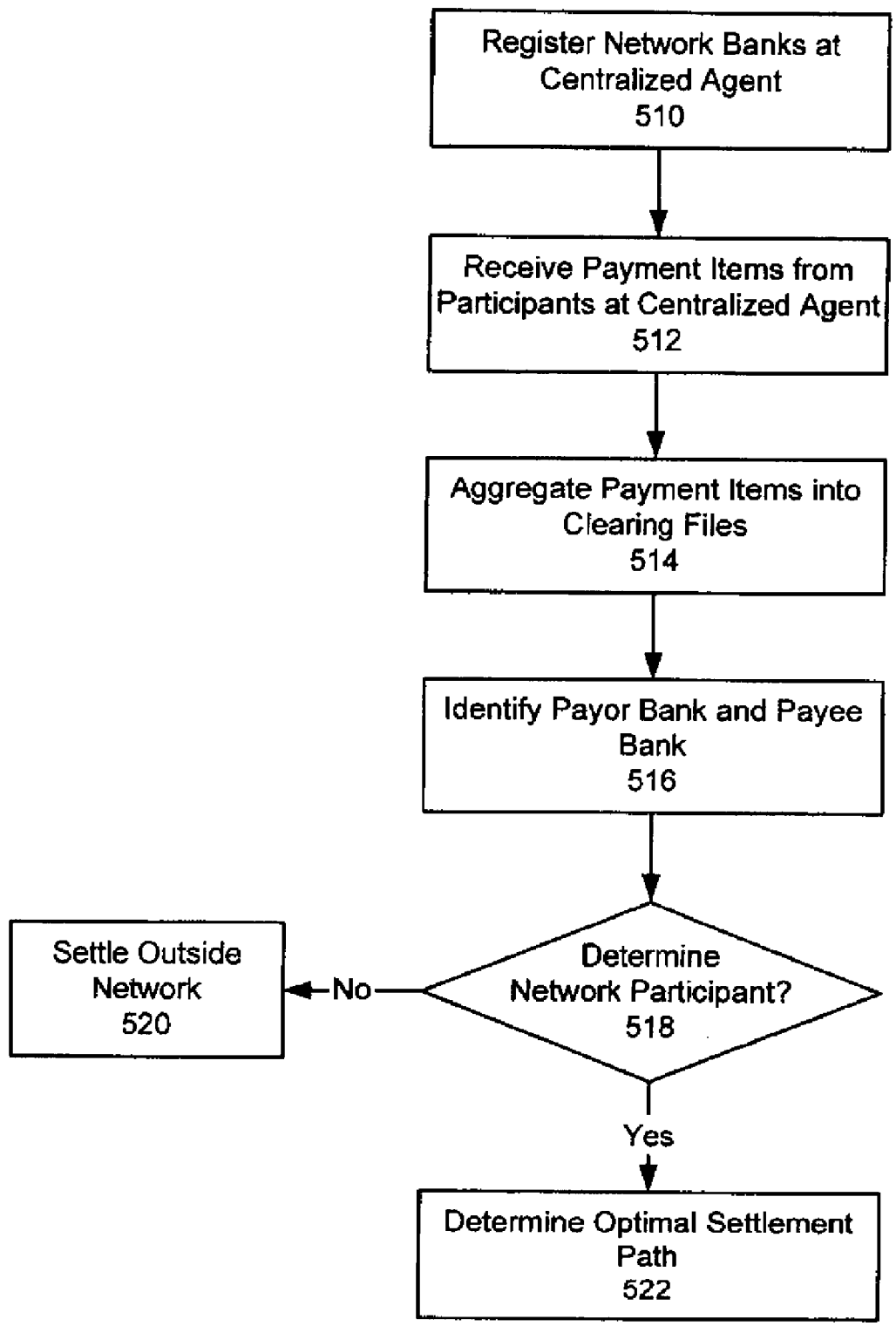
FIG. 5 is an exemplary flowchart illustrating a method for facilitating settlement processing within a network, in accordance with an embodiment of the present invention.

FIG. 5 is an exemplary method for facilitating settlement processing within a network, according to an embodiment of the present invention. At step 510, banks and/or other financial institutions may register with a centralized agent for participation in a network of an embodiment of the present invention. Registration may involve an agreement for clearing and settling financial transactions through the centralized agent. At step 512, various payment items from various sources may be received at the centralized agent. Payment items may include paper instruments, electronic images, and/or other types of payment. Any network and/or non-network entity may clear payments through the centralized agent. For example, network bank A may clear payments with network bank B. In addition, network bank C may clear payments with non-network bank D. Non network bank D may clear payments with bank A, bank B and/or bank C through the centralized agent.

At step 514, the payment items may be sorted or aggregated into various clearing files and/or image cash letters. For example, cash letters and ACH files representing multiple records or transactions may be accumulated to accommodate the nuances of their respective systems and/or business purposes. For example, ACH files may be required to have a minimum number of records (e.g., 10 records) per file. At step 516, a payor bank and a payee bank may be identified. At step 518, it may be determined whether the payor bank and the payee bank are part of the network. If either payor or payee are not part of the network, the centralized agent may act as a settlement or routing agent and settle the transactions with a third party settlement entity, at step 520. If it is determined that both payor and payee are part of the network, an optimal settlement path may be applied within the network using network resources, at step 522.

The payments network processing of an embodiment of the present invention offers the benefits of image and paper transaction processing, including but not limited to accepting transit items for clearing, sending on-us files gathered from the network, participating in image exchange and archiving images and/or other features and functions. Within this connected, multi-bank network would be the established agreements and infrastructure for clearing and settling of financial transactions.

The payment network of an embodiment of the present invention may provide the centralized agent's network banks, credit unions and/or other entities with the ability to clear and settle check transactions by sending and/or receiving payment items (e.g., paper or image cash letters, etc.) from any one of the other banks or other entities within the network. Other processing and/or functions may be performed. Consequently, through check settlement capabilities and relationships within the industry, the centralized agent may accept images and/or paper instruments from other financial institutions, banks, and/or other entities and aggregate its network customer's images into cash letters (and/or other instruments) and send them to the corresponding financial institution and/or other recipient. According to one exemplary application, a bank may act as the centralized agent and function as the clearing and settling bank for member banks' transit and on-us items that are being presented to and through the bank. Developing the network settlement capability will enable the centralized agent to become the same day presentment point for all banks, financial institutions and/or other participants in-network. The network of an embodiment of the present invention may provide distributed capture and lockbox solutions, along with image exchange capabilities to the various participants.

To understand the capabilities and advantages of the network of an embodiment of the present invention involves understanding check clearing in an electronified world without the limitations of paper processing, sorting or transportation. The network of an embodiment of the present invention allows any bank in the network to send to any other bank through the centralized agent without multiple intermediaries, transportation limitations and with an unlimited number of virtual sorter pockets with which to work. In the network of an embodiment of the present invention, the centralized agent may act as a funnel thereby collecting images from multiple sending sources and aggregating them into image in-clearings files, image cash letters and/or other format. In addition, the centralized agent may provide a posting file, archiving capabilities for images and/or other services. The centralized agent's ability to clear paper checks and present electronically to third party settlement entities (e.g., The Fed, SVPCo and Viewpointe, etc.) allows the centralized agent to present items from its network banks that are not cleared through the network. Likewise, the centralized agent may receive items drawn on the centralized agent (which may be a bank, financial institution, etc.) or any of its correspondent banks, financial institutions, etc., and present the items within the network for collection and settlement, either electronically, by image replacement document (IRD) and/or other method.

Various aspects of the present invention may provide benefits and advantages to a centralized agent's correspondent banks within the network, such as efficient clearing and settling, single point of access, cost savings, etc. Any bank or other entity participating in the network of an embodiment of the present invention may clear and settle checks with any other correspondent bank or other participating entity without leaving the network. Items presented to the centralized agent that are outside the network may be settled via image exchange, paper cash letter, IRD, etc. This offers a more cost effective settlement solution than through other clearing channels. An exemplary benefit may involve built-in savings on return presentment fees. As return presentment fees vary from institution to institution and media, an embodiment of the present invention provides cost efficiency benefits as the same (or similar) technology is used for forward collection process.

Through a single point of access for electronic processing and with the centralized agent providing capabilities for full image processing, in-clearings, outgoing cash letters and/or other functions, any participant may connect to the centralized agent (with appropriate backup capability) for image exchange and/or other service. Additional infrastructure, software, training, etc. are not necessary. Therefore, smaller banks may have access to various processing capabilities through an embodiment of the present invention without having to invest in costly software and other infrastructure.

Various efficiencies, including cost savings, may be realized. For example, in-network members may experience savings due to reduced ongoing operating expenses, reduced courier costs as well as reduced or eliminated capital investment and infrastructure. Implementation risks and costs may be reduced, including payment risks by earlier identification of returns. Various aspects of the present invention may allow for enhanced fraud and risk control services, such as same day hits on exceptions files. The network of an embodiment of the present invention may also provide faster check collection to reduce float.

The network and image processing capabilities of the embodiments of the present invention provide various benefits to the centralized agent. For example, reduced costs, reduced item passes, competitive advantages and/or other benefits may be realized. With the aggregate item volume of its many correspondent banks, plus the centralized agent's own volume, many items may be captured, posted and cleared without leaving the network, thereby reducing costs and increasing efficiency. For example, this structure minimizes per item clearing costs by reducing or eliminating the fees charged by third party settlement entities. Other savings may be realized through reduced transportation costs. From a revenue perspective, the opportunities for float earnings may be increased through faster settlement. Item passes may be reduced. For example, item passes may be saved in re-handles, reject repair and IRD print on the deposited items drawn on the network participants. Other efficiencies may be realized.

Competitive advantages may be realized by participants of the various embodiments of the present invention. For example, network competitors offering image-enabled exchange to small banks may include third party settlement entities. However, the centralized agent of an embodiment of the present invention may hold an advantage because none of these competitors can offer the complete processing and settlement package realized. Thus, the centralized agent has an advantage by offering productized versions of what it currently offers its own member banks and/or other customers. In addition, the centralized agent has an advantage of having a large corporate customer base as a part of its check volume. Additionally, because many of the other top banks do not have in-house archiving capabilities, they are unable to offer the complete service for image-enabled check processing and settlement. The centralized agent may function as the de facto standard for image processing within the industry.

An embodiment of the present invention may offer outgoing paper and image cash letters (along with other payment items) and offer paper and image in-clearings. Thus, an embodiment of the present invention may provide productized image in-clearings capabilities. And for customers to receive their items, a posting file for DDA systems, as well as offering archiving services for various items, including on-us and transit, may be provided. Because the centralized agent's solution lessens the need to invest in major technology and image exchange networks, participants may leverage the investments and infrastructure that the centralized agent may provide.

According to an embodiment of the present invention, the network may include productized versions of several core centralized transaction operations check processing capabilities. For example, capabilities may include, in various combinations, image in-clearings, image and paper cash letter, image archive, exceptions and returns (e.g., incoming and outgoing), research and adjustments, internet access, and/or other functionality. An embodiment of the present invention may provide the ability to accept correspondent customers' paper or images and provide the corresponding customers with a posting file, images and/or archive services. Another embodiment of the present invention may provide the ability to send paper or image cash letters to clear transit items. Another embodiment of the present invention may involve the ability to offer multiple-levels of archiving services to correspondents, including access for their customers. In addition, a correspondent customer may have the ability to view their exceptions and incoming returns online and decision the items through an embodiment of the present invention. Also, in-clearing customers may have the ability to inform the centralized agent, through an embodiment of the present invention, that certain items received should be returned to the originator of the item. Customers may also invoke a research and adjustment aspect of an embodiment of the present invention that leverages systems and archives. Having the data and images stored centrally permits the commercial use to actual customers that process transactions as part of their normal business. Internet access provides the correspondent bank with secured access to an archive function so that their customers can review image statements, a single item and/or other data.

Additional infrastructure may include a billing system, settlement engine, image exchange settlement agreements, clearing and settlement agreements and/or other functionality. Regarding the billing system, a Deposit Asset Management and Client Billing System may track services offered and volumes that are applied to pricing tables to create monthly billing. Regarding the settlement engine, various engines may be implemented. Regarding an Image Exchange Settlement Agreements, the centralized agent may establish necessary check image clearing agreements, such as those with Clearinghouse banks and other banks that may want to send to the centralized agent directly or receive from the centralized agent. Regarding the clearing and settlement agreements, multi-lateral agreements between the centralized agent and its correspondent customers may be utilized so the centralized agent may send and receive items for each of those banks on the network.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an AS/400-based operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

According to one specific embodiment of the present invention, the system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

While the invention has been particularly shown and described within the framework of claims processing, it will be appreciated that variations and modifications can be effected by a person of ordinary skill in the art without departing from the scope of the invention. Furthermore, one of ordinary skill in the art will recognize that such processes and systems do not need to be restricted to the specific embodiments described herein.

The invention claimed is:

1. A computer implemented method for facilitating settlement processing within a network of financial institutions, wherein the method is executed by a programmed computer processor which communicates with a user via a communication network, the computer implemented method comprising the steps of:

receiving, at a receive module using the programmed computer processor, one or more payment items from a plurality of payment entities via the communication network, at a centralized agent;

aggregating, at an aggregate module using the programmed computer processor, the one or more payment items into one or more categories;

identifying, at a decision module using the programmed computer processor, a payee financial institution and a payor financial institution for each payment item, wherein the payee financial institution and the payor financial institution are different;

determining, at a settlement module using the programmed computer processor, whether the payee financial institution and the payor financial institution are within the network of financial institutions;

for the payee financial institution and the payor financial institution within the network of financial institutions, determining a settlement path within the network of financial institutions for at least one of the one or more payment items; and for the payee financial institution and the payor financial institution that are not within the network of financial institutions, forwarding at least one of the one or more payment items to a third party settlement entity for settlement processing.

2. The method of claim 1, wherein the categories comprise one or more of image clearing files and image cash letters.

3. The method of claim 1, wherein the categories comprise payment entity.

4. The method of claim 1, wherein the settlement path comprises one or more of IRD, ACH, ARC, ECP, posting to a consumer account, wire transfer and data archive.

5. The method of claim 1, further comprising the step of:
archiving payment data associated with each payment item.

6. The method of claim 1, further comprising the step of:
providing access to data specific to payment items through an interface provided by the centralized agent.

7. The method of claim 6, wherein the interface is customized based on user specific criteria.

8. The method of claim 1, wherein the network of financial institutions comprises a combination of banks and credit unions.

9. The method of claim 1, wherein a non-network entity accesses the centralized agent for data exchange with at least one entity within the network.

10. The method of claim 1, wherein the step of aggregating further comprises the step of:
sorting the payment items into on-us items and transit items.

11. The method of claim 1, wherein a payment entity leverages the centralized agent's infrastructure for processing payment items.

12. A computer implemented method for facilitating settlement processing within a network of financial institutions, wherein the method is executed by a programmed computer processor which communicates with a user via a communication network, the computer implemented method comprising the steps of:

receiving, at a receive module using the programmed computer processor, one or more payment items from a plurality of payment entities via the communication network, at a centralized agent;

aggregating, at an aggregate module using the programmed computer processor, the one or more payment items into one or more categories;

sorting, at a sorting module using the programmed computer processor, the payment items into on-us items and transit items;

identifying, at a decision module using the programmed computer processor, a payee financial institution and a payor financial institution for each payment items, wherein the payee financial institution and the payor financial institution are different;

determining, at a settlement module using the programmed computer processor, whether the payee financial institution and the payor financial institution are within the network of financial institutions;

for the payee financial institution and the payor financial institution within the network of financial institutions, determining a settlement path within the network of financial institutions for at least one of the one or more payment items;

for the payee financial institution and the payor financial institution that are not within the network of financial institutions, forwarding at least one of the one or more payment items to a third party settlement entity for settlement processing; and providing access to data specific to payment items through an interface provided by the centralized agent, wherein the interface is customized based on user specific criteria;

wherein a non-network entity accesses the centralized agent for data exchange with at least one entity within the network and wherein a payment entity leverages the centralized agent's infrastructure for processing payment items.

13. A computer implemented system for facilitating settlement processing within a network of financial institutions, wherein the system comprises at least a programmed computer processor which communicates with a user via a communication network, the computer implemented system comprising:

a receive module, comprising at least one computer processor, configured to receive one or more payment items from a plurality of payment entities via the communication network;

an aggregate module, comprising at least one computer processor, configured to aggregate the one or more payment items into one or more categories;

a decision module, comprising at least one computer processor, configured to identify a payee financial institution and a payor financial institution for each payment items, wherein the payee financial institution and the payor financial institution are different and determining whether the payee financial institution and the payor financial institution are within the network of financial institutions; and a settlement module, comprising at least one computer processor, configured to determine a settlement path within the network of financial institutions for each payment item for the payee financial institution and the payor financial institution within the network of financial institutions and forwarding the payment items to a third party settlement entity for settlement processing for the payee financial institution and the payor financial institution that are not within the network of financial institutions.

14. The system of claim 13, wherein the categories comprise one or more of image clearing files and image cash letters.

15. The system of claim 13, wherein the categories comprise payment entity.

16. The system of claim 13, wherein the settlement path comprises one or more of IRD, ACH, ARC, ECP, posting to a consumer account, wire transfer and data archive.

17. The system of claim 13, further comprising:
an archive module for archiving payment data associated with each payment item.

18. The system of claim 13, further comprising:
an interface for providing access to data specific to payment items, wherein the interface is provided by the centralized agent.

19. The system of claim 18, wherein the interface is customized based on user specific criteria.

20. The system of claim 13, wherein the network of financial institutions comprises a combination of banks and credit unions.

21. The system of claim 13, wherein a non-network entity accesses the centralized agent for data exchange with at least one entity within the network.

22. The system of claim 13, wherein the aggregation module further sorts the payment items into on-us items and transit items.

23. The system of claim 13, wherein a payment entity leverages the centralized agent's infrastructure for processing payment items.

24. A computer implemented system for facilitating settlement processing within a network of financial institutions, wherein the system comprises at least a programmed computer processor which communicates with a user via a communication network, the computer implemented system comprising:

a receive module, comprising at least one computer processor, configured to receive one or more payment items from a plurality of payment entities via the communication network;

an aggregate module, comprising at least one computer processor, configured to aggregate the one or more payment items into one or more categories and sorting the payment items into on-us items and transit items;

a decision module, comprising at least one computer processor, configured to identify a payee financial institution and a payor financial institution for each payment items, wherein the payee financial institution and the payor financial institution are different and determining whether the payee financial institution and the payor financial institution are within the network of financial institutions;

a settlement module, comprising at least one computer processor, configured to determine a settlement path within the network of financial institutions for each payment item for the payee financial institution and the payor financial institution within the network of financial institutions and forwarding the payment items to a third party settlement entity for settlement processing for the payee financial institution and the payor financial institution that are not within the network of financial institutions; and an interface configured to provide access to data specific to payment items, wherein the interface is customized based on user specific criteria;

wherein the receive module, the aggregate module, the decision module, the settlement module and the interface reside at a centralized agent and wherein a non-network entity accesses the centralized agent for data exchange with at least one entity within the network and wherein a payment entity leverages the centralized agent's infrastructure for processing payment items.

* * * * *